United States Patent
Otsuka et al.

(10) Patent No.: US 11,858,240 B2
(45) Date of Patent: *Jan. 2, 2024

(54) MULTILAYER CONTAINER, METHOD FOR MANUFACTURING SAME, AND METHOD FOR MANUFACTURING RECLAIMED POLYESTER

(71) Applicant: Mitsubishi Gas Chemical Company, Inc., Tokyo (JP)

(72) Inventors: Kosuke Otsuka, Kanagawa (JP); Masayuki Daito, Kanagawa (JP); Takumi Yamada, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/800,752

(22) PCT Filed: Feb. 25, 2021

(86) PCT No.: PCT/JP2021/007014
§ 371 (c)(1),
(2) Date: Aug. 18, 2022

(87) PCT Pub. No.: WO2021/177126
PCT Pub. Date: Sep. 10, 2021

(65) Prior Publication Data
US 2023/0123413 A1   Apr. 20, 2023

(30) Foreign Application Priority Data

Mar. 6, 2020 (JP) ................................. 2020-038962
Aug. 20, 2020 (JP) ................................. 2020-139561

(51) Int. Cl.
B32B 27/08    (2006.01)
B32B 27/20    (2006.01)
B32B 27/34    (2006.01)
B32B 27/36    (2006.01)

(52) U.S. Cl.
CPC .............. *B32B 27/08* (2013.01); *B32B 27/20* (2013.01); *B32B 27/34* (2013.01); *B32B 27/36* (2013.01); *B32B 2270/00* (2013.01); *B32B 2307/4026* (2013.01); *B32B 2439/00* (2013.01)

(58) Field of Classification Search
CPC ......... B32B 27/08; B32B 27/20; B32B 27/34; B32B 27/36; B32B 2270/00; B32B 2307/4026
See application file for complete search history.

(56) References Cited

U.S. PATENT DOCUMENTS

2018/0072844 A1 * 3/2018 Otsuka ................... C08G 69/26

FOREIGN PATENT DOCUMENTS

| JP | S57-123051 A   | 7/1982 |
| JP | 2014-069829 A  | 4/2014 |
| JP | 2014-114060 A  | 6/2014 |
| JP | 2016-198912 A  | 12/2016 |
| JP | 2018-043773 A  | 3/2018 |
| WO | 2016/027577 A1 | 2/2016 |
| WO | 2017/057463 A1 | 4/2017 |
| WO | 2019/208502 A1 | 10/2019 |

OTHER PUBLICATIONS

International Search Report for PCT/JP2021/007014 dated Apr. 27, 2021, and English Translation submitted herewith (6 pages).

* cited by examiner

*Primary Examiner* — Michael C Miggins
(74) *Attorney, Agent, or Firm* — Fitch, Even, Tabin & Flannery LLP

(57) ABSTRACT

Provided is a multilayer container including a polyester layer containing a polyester resin (X), and a polyamide layer containing a polyamide resin (Y), a yellowing inhibitor (A), and an oxidation accelerator (B). The content of the polyamide resin (Y) is from 0.05 to 7.0 mass % relative to the total amount of all polyamide layers and all polyester layers. The yellowing inhibitor (A) is a dye, and the content of the yellowing inhibitor (A) is from 1 to 30 ppm relative to the total amount of all polyamide layers and all polyester layers.

20 Claims, No Drawings

MULTILAYER CONTAINER, METHOD FOR MANUFACTURING SAME, AND METHOD FOR MANUFACTURING RECLAIMED POLYESTER

CROSS-REFERENCE TO RELATED APPLICATIONS

This application is a U.S. national phase application filed under 35 U.S.C. § 371 of International Application Number PCT/JP2021/007014, filed Feb. 25, 2021, designating the United States, which claims priority from Japanese Application Number 2020-139561, filed Aug. 20, 2020, and from Japanese Application Number 2020-038962, filed Mar. 6, 2020.

FIELD OF THE INVENTION

The present invention relates to a multilayer container, a method for manufacturing the same, and a method for manufacturing a recycled polyester.

BACKGROUND OF THE INVENTION

Aromatic polyester resins obtained using an aromatic dicarboxylic acid compound and an aliphatic diol compound as monomers exhibit merits such as transparency, mechanical performance, melt stability, solvent resistance, fragrance retention, gas barrier properties, and recyclability. Therefore, aromatic polyester resins such as polyethylene terephthalate (PET) are widely used in various packaging materials such as films, sheets, and hollow containers. Polyester resins have high gas barrier properties, but their gas barrier properties are not necessarily sufficient for applications requiring an even higher level of gas barrier properties for gases such as oxygen and carbon dioxide. Therefore, as a means to improve the gas barrier properties of polyester resins, aluminum oxide or silicon oxide is vapor deposited onto a molded body or packaging container made from a polyester resin, or a resin having high gas barrier performance is applied and laminated onto a molded article or packaging container made from a polyester resin, or is melted and mixed therewith.

Examples of the gas barrier resins include polyamide resins such as nylon 6 and nylon 66, and ethylene-vinyl alcohol copolymers. Among the polyamide resins, polyxylylene adipamide obtained by polymerizing a diamine component mainly composed of xylylene diamine and a dicarboxylic acid component mainly composed of adipic acid exhibits excellent gas barrier properties. Polyxylylene adipamide has high gas barrier properties, and the glass transition temperature, melting point, and crystallinity of polyxylylene adipamide are similar to those of polyethylene terephthalate, which is a widely used polyester resin, and therefore polyxylylene adipamide is easily laminated onto and melt-mixed with a polyester resin. For this reason, polyxylylene adipamide is very suitable as a material for improving the gas barrier properties of polyester resins.

However, in a polyester resin composition containing a polyamide, yellowing due to thermal history is more likely to proceed than with polyester alone. As a result, yellowing occurs particularly in a recycling process in which containers are collected and the resin is reused. This is a factor that reduces the product value of packaging containers, and thus measures for suppressing yellowing are being investigated. For example, Patent Document 1 discloses a multilayer container that includes a polyester resin composition layer containing a polyester resin and an amino group-containing compound having yellowing suppression performance, and a polyamide resin layer containing a polyamide resin, and also discloses a method for manufacturing recycled polyester.

CITATION LIST

Patent Documents

Patent Document 1: WO 2017/057463

SUMMARY OF INVENTION

Yellowing of recycled polyesters is significantly affected by oxidation, and when a material that absorbs oxygen is used in a container, yellowing is exacerbated, and thus it becomes difficult to improve the oxygen barrier property of the container. Thus, a demand exists for a container that can both suppress yellowing and achieve a high oxygen barrier property.

Therefore, the present invention addresses the problem of providing a multilayer container that exhibits an excellent oxygen barrier property and can suppress yellowing of recycled polyester when recycled, and providing a method for manufacturing recycled polyester in which yellowing is suppressed.

As a result of diligent investigation in view of the above-described problems, the present inventors discovered that a multilayer container including a polyester layer, and a polyamide layer containing a polyamide resin, a specific yellowing inhibitor and an oxidation accelerator can solve the problems described above, and thereby the present inventors arrived at the present invention.

The present invention provides the following aspects (1) to (25).

[1] A multilayer container including: a polyester layer containing a polyester resin (X); and a polyamide layer containing a polyamide resin (Y), a yellowing inhibitor (A), and an oxidation accelerator (B); the content of the polyamide resin (Y) being from 0.05 to 7.0 mass % relative to the total amount of all polyamide layers and all polyester layers; the yellowing inhibitor (A) being a dye; and the content of the yellowing inhibitor (A) being from 1 to 30 ppm relative to the total amount of all polyamide layers and all polyester layers.

[2] The multilayer container according to [1], wherein the polyester resin (X) includes a constituent unit derived from a dicarboxylic acid and a constituent unit derived from a diol, 80 mol % or greater of the constituent unit derived from a dicarboxylic acid being a constituent unit derived from terephthalic acid, and 80 mol % or greater of the constituent unit derived from a diol being a constituent unit derived from ethylene glycol.

[3] The multilayer container according to [1] or [2], wherein the polyamide resin (Y) includes a constituent unit derived from a diamine and a constituent unit derived from a dicarboxylic acid, 80 mol % or greater of the constituent unit derived from a diamine being a constituent unit derived from xylylene diamine, and 80 mol % or greater of the constituent unit derived from a dicarboxylic acid being a constituent unit derived from adipic acid.

[4] The multilayer container according to any one of [1] to [3] above, wherein the oxidation accelerator (B) is a compound containing a transition metal.

[5] The multilayer container according to [4], wherein the transition metal is at least one selected from the group consisting of cobalt, iron, manganese, and nickel.

[6] The multilayer container according to any one of [1] to [5], wherein the yellowing inhibitor (A) is an anthraquinone-based dye.

[7] The multilayer container according to any one of [1] to [6], wherein the polyamide layer further contains a greening inhibitor (C).

[8] The multilayer container according to [7], wherein the greening inhibitor (C) is at least one selected from the group consisting of anthraquinone-based dyes and azo-based dyes.

[9] The multilayer container according to any one of [1] to [8], wherein the polyamide layer further contains a polyester resin (Z).

[10] The multilayer container according to [9], wherein the content of the polyester resin (Z) in the polyamide layer is from 5 to 70 mass %.

[11] The multilayer container according to any one of [1] to [10], wherein the multilayer container is a hollow multilayer container.

[12] The multilayer container according to any one of [1] to [11], wherein the multilayer container has a 2 to 5 layer structure, and an outermost layer is a polyester layer.

[13] The multilayer container according to any one of [1] to [12], wherein the multilayer container has a 3 to 5 layer structure, and the outermost layer and an innermost layer are polyester layers.

[14] A method for manufacturing a multilayer container including a polyester layer containing a polyester resin (X), and a polyamide layer containing a polyamide resin (Y), a yellowing inhibitor (A), and an oxidation accelerator (B); the content of the polyamide resin (Y) being from 0.05 to 7.0 mass % relative to the total amount of all polyamide layers and all polyester layers; the yellowing inhibitor (A) being a dye; and the content of the yellowing inhibitor (A) being from 1 to 30 ppm relative to the total amount of all polyamide layers and all polyester layers; and the manufacturing method including: a step 1 of mixing the polyamide resin (Y), the yellowing inhibitor (A), and the oxidation accelerator (B) to prepare a polyamide resin mixture; a step 2 of co-injection molding the polyamide resin mixture and a polyester resin composition containing the polyester resin (X), and thereby obtaining a multilayer preform; and a step 3 of blow molding the multilayer preform.

[15] The method for manufacturing a multilayer container according to [14], wherein in step 1, a greening inhibitor (C) is further mixed.

[16] The method for manufacturing a multilayer container according to or [15], wherein in step 1, a polyester resin (Z) is further mixed.

[17] The method for manufacturing a multilayer container according to any one of to [16], wherein in step 1, a polyamide resin or polyester resin, the yellowing inhibitor (A), and the oxidation accelerator (B) are kneaded and then mixed with the polyamide resin (Y).

[18] The method for manufacturing a multilayer container according to any one of to [17], wherein the oxidation accelerator (B) is a compound containing a transition metal.

[19] The manufacturing method for a multilayer container according to [18], wherein the transition metal is at least one selected from the group consisting of cobalt, iron, manganese, and nickel.

[20] The method for manufacturing a multilayer container according to any one of to [19], wherein the yellowing inhibitor (A) is an anthraquinone-based dye.

[21] The method for manufacturing a multilayer container according to any one of to [20], wherein the greening inhibitor (C) is at least one selected from the group consisting of anthraquinone-based dyes and azo-based dyes.

[22] A method for manufacturing a recycled polyester, the method including recovering polyester from the multilayer container described in any one of [1] to [13].

[23] The method for manufacturing a recycled polyester according to [22], the method including removing all or a portion of the polyamide layer from the multilayer container and recovering the polyester.

[24] The method for manufacturing a recycled polyester according to or [23], wherein the polyamide layer is removed by air elutriation after the multilayer container has been ground.

[25] The method for manufacturing a recycled polyester according to any one of to [24], wherein one or more steps selected from crystallization and solid phase polymerization are implemented after recovering the polyester.

According to the present invention, a multilayer container that exhibits an excellent oxygen barrier property and can suppress yellowing of recycled polyester when recycled, and a method for manufacturing recycled polyester in which yellowing is suppressed can be provided.

DESCRIPTION OF EMBODIMENTS

[Multilayer Container]

A multilayer container according to the present invention includes: a polyester layer containing a polyester resin (X); and a polyamide layer containing a polyamide resin (Y), a yellowing inhibitor (A), and an oxidation accelerator (B); the content of the polyamide resin (Y) is from 0.05 to 7.0 mass % relative to the total amount of all polyamide layers and all polyester layers; the yellowing inhibitor (A) is a dye; and the content of the yellowing inhibitor (A) is from 1 to 30 ppm relative to the total amount of all polyamide layers and all polyester layers.

The reason why the multilayer container of the present invention can achieve an oxygen barrier property while also suppressing yellowing of the recycled polyester is not clear, but is considered to be as follows.

An oxygen barrier layer is formed by the polyamide resin, and the oxidation accelerator contributes to oxygen absorption, and therefore the oxygen barrier property can be enhanced. Furthermore, the yellowing inhibitor is a dye having a stable structure, and a small amount of the yellowing inhibitor efficiently suppresses yellowing of the recycled polyester without inhibiting the oxidation acceleration action thereof. Thus, it is thought that as a result thereof, the multilayer container of the present invention is able to achieve both of these properties.

The "total amount of all polyamide layers and all polyester layers" is the total mass of all polyamide layers and all polyester layers configuring the multilayer container, and when a plurality of layers of each are present, it is the total amount of all of these layers.

<Polyester Layer>

The polyester layer contains a polyester resin (X).

(Polyester Resin (X))

The polyester resin (X) contained in the polyester layer is preferably a polycondensation polymer of a dicarboxylic acid and a diol, and preferably includes a constituent unit derived from a dicarboxylic acid (hereinafter, also referred to as a "dicarboxylic acid unit") and a constituent unit derived from a diol (hereinafter, also referred to as a "diol unit").

Examples of the dicarboxylic acid unit include constituent units derived from aromatic dicarboxylic acids, constituent units derived from alicyclic dicarboxylic acids, and constituent units derived from aliphatic dicarboxylic acids, and constituent units derived from aromatic dicarboxylic acids are preferred.

Examples of the aromatic dicarboxylic acid include terephthalic acid, isophthalic acid, orthophthalic acid, biphenyl dicarboxylic acid, diphenyl ether dicarboxylic acid, diphenylsulfone dicarboxylic acid, diphenylketone dicarboxylic acid, 2,6-naphthalene dicarboxylic acid, 1,4-naphthalene dicarboxylic acid, and 2,7-naphthalene dicarboxylic acid. From perspectives of cost and manufacturing ease, terephthalic acid, isophthalic acid, orthophthalic acid, naphthalene dicarboxylic acid, and 4,4'-biphenyl dicarboxylic acid are preferable, and terephthalic acid, isophthalic acid, and naphthalene dicarboxylic acid are more preferable, and from the perspective of moldability, terephthalic acid and isophthalic acid are further preferable, and terephthalic acid is even more preferable.

Note that as the aromatic dicarboxylic acid, a $C_{1-4}$ alkyl ester of an aromatic dicarboxylic acid may be used.

When the multilayer container of the present invention is to be recycled, the multilayer container may be melt-kneaded with a typical monolayer container made of a polyester resin. Since the multilayer container of the present invention includes a unit derived from terephthalic acid as a dicarboxylic acid unit, miscibility of the multilayer container with a typical monolayer container is favorable, and good recyclability is obtained.

As the aromatic dicarboxylic acid, a sulfophthalic acid and a metal sulfophthalate may be used. The metal sulfophthalate is a metal salt of a sulfophthalic acid, and examples of the metal atom include alkali metals and alkaline earth metals.

Specifically, the sulfophthalic acid and metal sulfophthalate are represented by Formulas (I) and (I') below, respectively.

[Chem. 1]

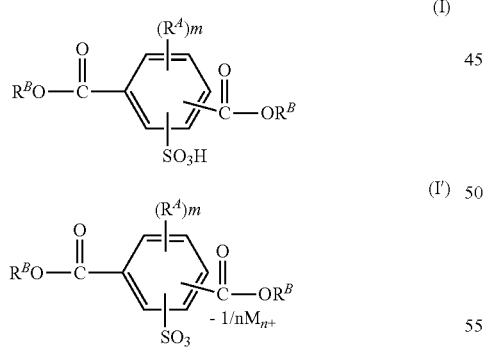

(I)

(I')

In Formula (I') above, M is a metal atom, and n represents the valence of M.

Examples of the metal atom M include alkali metals such as lithium, sodium, and potassium; and alkaline earth metals such as beryllium, magnesium, calcium, and strontium. Of these, an alkali metal is preferable, in which sodium or lithium is more preferable, and sodium is more preferable. Note that when n is 2 or greater, crosslinking with other units (for example, sulfo groups in other sulfophthalic acid units or metal sulfophthalate units) through M may occur.

In Formulas (I) and (I') above, $R^A$ is a substituted or unsubstituted alkyl group or a substituted or unsubstituted aryl group, and m represents an integer of 0 to 3. Note that when m is 2 or 3, each $R^A$ may be the same or different.

Examples of the alkyl group include a methyl group, ethyl group, n-propyl group, isopropyl group, n-butyl group, t-butyl group, n-octyl group, and 2-ethylhexyl group. Among these, a $C_{1-6}$ alkyl group is preferable, and a $C_{1-4}$ alkyl group is more preferable.

Examples of the aryl group include a phenyl group and a naphthyl group. Among these, a $C_{6-12}$ aryl group is preferable, and a phenyl group is more preferable.

Examples of the substituents of the alkyl group and the aryl group include halogen atoms such as a chlorine atom, a bromine atom, or an iodine atom, an alkyl group, alkenyl group, aryl group, cyano group, hydroxyl group, nitro group, alkoxy group, aryloxy group, acyl group, amino group, mercapto group, alkylthio group, and an arylthio group. Among these groups, those having a hydrogen atom may be further substituted with the substituents described above.

Specific examples of the $R^A$ include a methyl group, ethyl group, n-propyl group, isopropyl group, n-butyl group, t-butyl group, 1-methylpropyl group, 2-methylpropyl group, hydroxymethyl group, 1-hydroxyethyl group, mercaptomethyl group, methyl thioethyl group, phenyl group, naphthyl group, biphenyl group, benzyl group, and 4-hydroxybenzyl group. Of these, a methyl group, ethyl group, and benzyl group are preferable.

In Formulas (I) and (I') above, $R^B$ represents a hydrogen atom or an alkyl group having from 1 to 4 carbons.

The preferred R A is as described above, but the sulfophthalic acid or metal sulfophthalate used in the polyester resin (X) is preferably a unit represented by Formula (Ia) or (I'a) below, respectively, where m is 0, or in other words, the benzene ring is not substituted with $R^A$.

[Chem. 2]

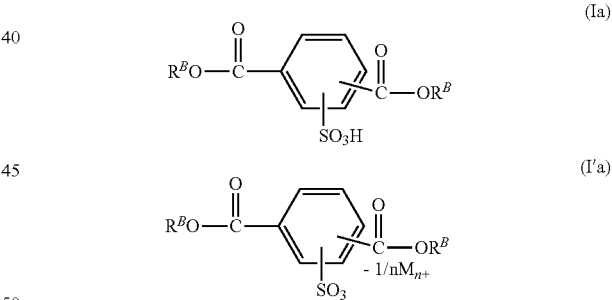

(Ia)

(I'a)

In Formula (Ia) above, $R^B$ is the same as $R^B$ in Formula (I).

Moreover, in Formula (I'a) above, $R^B$, M, and n are the same as the $R^B$, M, and n in Formula (I').

Furthermore, examples of the sulfophthalic acid represented by Formula (Ia) or the metal sulfophthalate represented by Formula (I'a) include phthalic acid structures in which two —CO— are bonded at the ortho position, isophthalic acid structures in which two —CO— are bonded at the meta position, and terephthalic acid structures in which two —CO— are bonded at the para position. Among these, an isophthalic acid structure is preferable. In other words, the sulfophthalic acid or metal sulfophthalate is preferably at least one of a sulfoisophthalic acid represented by Formula (Ib) below or a metal sulfoisophthalate represented by Formula (I'b) below.

[Chem. 3]

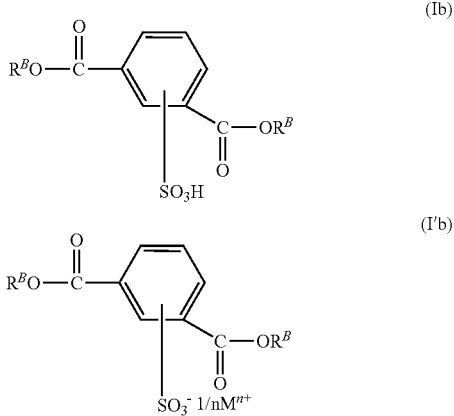

In Formula (Ib) above, $R^B$ is the same as $R^B$ in Formula (I).

Moreover, in Formula (I'b) above, $R^B$, M, and n are the same as the $R^B$, M, and n in Formula (I').

The position of the sulfo group in the sulfoisophthalic acid or the metal sulfoisophthalate may be the 2-, 4-, 5-, and 6-positions, but is preferably substituted at the 5-position as represented by Formula (Ic) or (I'c) below.

[Chem. 4]

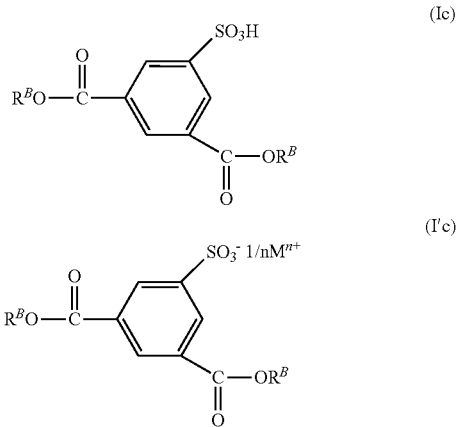

In Formula (Ic) above, $R^B$ is the same as $R^B$ in Formula (I).

In Formula (I'c) above, $R^B$, M, and n are the same as the $R^B$, M, and n in Formula (I').

Examples of the sulfoisophthalic acid represented by Formula (Ic) or the metal sulfoisophthalate represented by Formula (I'c) in the polyester resin (X) include 5-sulfoisophthalic acid, sodium 5-sulfoisophthalate, lithium 5-sulfoisophthalate, potassium 5-sulfoisophthalate, calcium bis(5-sulfoisophthalate), sodium dimethyl 5-sulfoisophthalate, and sodium diethyl 5-sulfoisophthalate.

In a case where the polyester resin (X) contains a constituent unit derived from at least one selected from the group consisting of sulfophthalic acids and metal sulfophthalates, the resin preferably contains at least a constituent unit derived from a metal sulfophthalate. The content of the constituent units derived from a sulfophthalic acid and a metal sulfophthalate in the polyester resin is preferably from 0.01 to 15 mol %, more preferably from 0.03 to 10.0 mol %, even more preferably from 0.06 to 5.0 mol %, and yet even more preferably from 0.08 to 2.0 mol %.

Examples of the alicyclic dicarboxylic acid include cyclohexane dicarboxylic acid, norbornene dicarboxylic acid, and tricyclodecane dicarboxylic acid.

Examples of the aliphatic dicarboxylic acid include malonic acid, succinic acid, adipic acid, azelaic acid, and sebacic acid.

Examples of the diol unit include constituent units derived from aliphatic diols, constituent units derived from alicyclic diols, and constituent units derived from aromatic diols, and constituent units derived from aliphatic diols are preferable.

Examples of the aliphatic diols include ethylene glycol, 2-butene-1,4-diol, trimethylene glycol, tetramethylene glycol, hexamethylene glycol, neopentyl glycol, methylpentanediol, and diethylene glycol. Among these, ethylene glycol is preferable.

Examples of the alicyclic diols include cyclohexane dimethanol, isosorbide, spiroglycol, 2,2,4,4-tetramethyl-1,3-cyclobutanediol, norbornene dimethanol and tricyclodecane dimethanol.

Examples of the aromatic diols include bisphenol compounds and hydroquinone compounds.

The polyester resin (X) may have a constituent unit derived from a hydroxycarboxylic acid.

Examples of the hydroxycarboxylic acid include aliphatic hydroxycarboxylic acids, alicyclic hydroxycarboxylic acids, and aromatic hydroxycarboxylic acids.

Examples of the aliphatic hydroxycarboxylic acids include 10-hydroxyoctadecanoic acid, lactic acid, hydroxyacrylic acid, 2-hydroxy-2-methylpropionic acid, and hydroxybutyric acid.

Examples of the alicyclic hydroxycarboxylic acids include hydroxymethyl cyclohexane carboxylic acid, hydroxymethyl norbornene carboxylic acid, and hydroxymethyl tricyclodecane carboxylic acid.

Examples of the aromatic hydroxycarboxylic acids include hydroxybenzoic acid, hydroxytoluic acid, hydroxynaphthoic acid, 3-(hydroxyphenyl)propionic acid, hydroxyphenylacetic acid, and 3-hydroxy-3-phenylpropionic acid.

The polyester resin (X) may have a constituent unit derived from a monofunctional compound and a constituent unit derived from a polyfunctional compound.

Examples of the monofunctional compound include monocarboxylic acids and monoalcohols, and specifically include aromatic monocarboxylic acids, aliphatic monocarboxylic acids, aromatic monoalcohols, aliphatic monoalcohols, and alicyclic monoalcohols.

Examples of the polyfunctional compound include aromatic polycarboxylic acids, alicyclic polycarboxylic acids, aliphatic polyhydric alcohols, alicyclic polyhydric alcohols, and esters thereof.

The polyester resin (X) preferably includes a constituent unit derived from a dicarboxylic acid containing a terephthalic acid-derived constituent unit, and a constituent unit derived from a diol containing an ethylene glycol-derived constituent unit; more preferably has a constituent unit derived from a dicarboxylic acid containing 80 mol % or greater of a terephthalic acid-derived constituent unit, and a constituent unit derived from a diol containing 80 mol % or greater of an ethylene glycol-derived constituent unit; even more preferably has a constituent unit derived from a dicarboxylic acid containing 90 mol % or greater of a terephthalic acid-derived constituent unit, and a constituent unit derived from a diol containing 90 mol % or greater of an ethylene glycol-derived constituent unit; and yet even more preferably has a constituent unit derived from a dicarboxylic acid containing 98 mol % or greater of a terephthalic acid-derived constituent unit, and a constituent unit derived from a diol containing substantially 100 mol % of an ethylene glycol-derived constituent unit.

Specific examples of the polyester resin (X) include polyethylene terephthalate (PET).

The polyethylene terephthalate (PET) may include a constituent unit derived from an aromatic dicarboxylic acid other than terephthalic acid. The aromatic dicarboxylic acid other than terephthalic acid is preferably one or more selected from isophthalic acid, orthophthalic acid, naphthalene dicarboxylic acid, and 4,4'-biphenyldicarboxylic acid. These aromatic dicarboxylic acids are inexpensive, and a copolymerized polyester resin containing these aromatic dicarboxylic acids is easily manufactured.

Among these, isophthalic acid and naphthalene dicarboxylic acid are preferable, and isophthalic acid is more preferable. The polyethylene terephthalate containing a constituent unit derived from isophthalic acid excels in moldability, and is also excellent from the standpoint of preventing whitening of a molded article due to the low crystallization rate. In addition, a polyethylene terephthalate containing a constituent unit derived from naphthalene dicarboxylic acid increases the glass transition point of the resin, improves the heat resistance, and absorbs ultraviolet rays. Therefore, such polyethylene terephthalate is suitably used in the manufacturing of a multilayer container requiring resistance to ultraviolet rays. Note that a 2,6-naphthalene dicarboxylic acid component is preferable as the naphthalene dicarboxylic acid because it is easy to be manufactured and is highly economical.

When the polyethylene terephthalate includes a constituent unit derived from an aromatic dicarboxylic acid other than terephthalic acid, the proportion of the constituent unit derived from an aromatic dicarboxylic acid other than terephthalic acid is preferably from 1 to 20 mol %, more preferably from 1 to 10 mol %, and even more preferably from 1 to 5 mol % of the dicarboxylic acid units.

Among these, when the polyethylene terephthalate includes a constituent unit derived from isophthalic acid, the proportion of the constituent unit derived from isophthalic acid is preferably from 1 to 20 mol %, more preferably from 1 to 10 mol %, and even more preferably from 1 to 5 mol % of the dicarboxylic acid units.

Note that one type of polyester resin (X) may be used alone, or two or more types may be combined and used.

The polyester resin (X) can be manufactured through a known method such as direct esterification or transesterification.

The intrinsic viscosity of the polyester resin (X) is preferably from 0.5 to 2.0 dL/g, and more preferably from 0.6 to 1.5 dL/g. When the intrinsic viscosity is 0.5 dL/g or higher, the mechanical properties of the container are excellent.

Note that the intrinsic viscosity is measured by dissolving the polyester resin in a mixed solvent of phenol/1,1,2,2-tetrachloroethane (=6/4 mass ratio) to prepare 0.2, 0.4, and 0.6 g/dL solutions, and then measuring the intrinsic viscosity at 25° C. using an automatic viscosity measuring apparatus (Viscotek, available from Malvern Instruments Limited).
(Other Components)

The polyester layer may contain other components. Examples of the other components include thermal stabilizers, photostabilizers, moisture-proof agents, waterproofing agents, lubricants, and spreading agents.

The polyester layer may contain, within a range that does not impair the effects of the present invention, a resin other than the polyester resin (X) that is a main component. The content of the polyester resin (X) is preferably from 80 to 100 mass %, and more preferably from 90 to 100 mass %, relative to the amount of resin in the entire polyester layer.
<Polyamide Layer>

The polyamide layer contains a polyamide resin (Y), a yellowing inhibitor (A), and an oxidation accelerator (B). Further, the content of the polyamide resin (Y) contained in the polyamide layer is from 0.05 to 7.0 mass % relative to the total amount of all polyamide layers and all polyester layers, the yellowing inhibitor (A) is a dye, and the content of the yellowing inhibitor (A) is from 1 to 30 ppm relative to the total amount of all polyamide layers and all polyester layers.

Providing a polyamide layer enables a multilayer container having a high oxygen barrier property. By further containing, in the polyamide layer, the oxidation accelerator (B) and the yellowing inhibitor (A), which is a dye, the present invention is able to achieve an extremely high oxygen barrier property while also suppressing yellowing of the recycled polyester manufactured from the multilayer container.

The reason why such an excellent effect is exhibited is not clear, but is thought to be as follows.

In the present invention, yellowing can be effectively suppressed by containing the yellowing inhibitor (A) in a nitrogen-containing polyamide layer, which tends to cause yellowing of a recycled resin. However, when these yellowing inhibitors coexist with an oxidation accelerator, oxygen absorption is inhibited by the oxidation accelerator. In the present invention, however, a specific amount of a dye that does not easily inhibit an oxidation reaction is used as the yellowing inhibitor and is contained in the polyamide layer along with an oxidation accelerator, and it is thought that thereby, oxygen absorption performance can be enhanced while exhibiting effective yellowing suppression performance.
(Polyamide Resin (Y))

Examples of the polyamide resin (Y) include xylylene group-containing polyamide resins, nylon 6, nylon 66, nylon 666, nylon 610, nylon 11, nylon 12, and mixtures thereof. Among these, xylylene group-containing polyamide resins are preferable because the gas barrier performance can be improved and the polyamide resin can be easily separated from the polyester layer when recycling. The xylylene group-containing polyamide resin is preferably a polyamide resin containing a constituent unit derived from xylylene diamine.

The xylylene group-containing polyamide resin is obtained by polycondensation of a dicarboxylic acid and a diamine containing a xylylene diamine, and includes a constituent unit derived from a xylylene diamine and a constituent unit derived from a dicarboxylic acid. Furthermore, the xylylene-group containing polyamide resin preferably contains at least 50 mol %, more preferably at least 70 mol %, even more preferably from 80 to 100 mol %, and yet even more preferably from 90 to 100 mol % of a constituent unit derived from xylylene diamine from among the constituent units derived from diamine (diamine units).

The xylylene diamine is preferably meta-xylylene diamine, para-xylylene diamine, or both, and is more preferably meta-xylylene diamine. Furthermore, preferably at least 50 mol %, more preferably at least 70 mol %, even more preferably from 80 to 100 mol %, and yet even more preferably from 90 to 100 mol % of the diamine units constituting the xylylene group-containing polyamide resin are constituent units derived from meta-xylylene diamine. When the amount of constituent units derived from meta-xylylene diamine in the diamine units is within the aforementioned range, the gas barrier properties of the polyamide resin are further improved.

The diamine unit in the xylylene group-containing polyamide resin may include only a constituent unit derived from xylylene diamine, or may include a constituent unit derived from diamines other than xylylene diamine. Here, examples of diamines other than xylylene diamine include, but are not limited to, aliphatic diamines having a linear or branched structure, such as ethylene diamine, tetramethylene diamine, pentamethylene diamine, 2-methylpentane diamine, hexamethylene diamine, heptamethylene diamine, octamethylene diamine, nonamethylene diamine, decamethylene diamine, dodecamethylene diamine, 2,2,4-trimethyl-hexamethylene diamine, and 2,4,4-trimethyl-hexamethylene diamine; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having an aromatic ring, such as bis(4-aminophenyl)ether, paraphenylene diamine, and bis(aminomethyl) naphthalene.

Examples of compounds that can configure the dicarboxylic acid unit in the xylylene group-containing polyamide resin include $C_{4-20}$ α,ω-linear aliphatic dicarboxylic acids, such as succinic acid, glutaric acid, adipic acid, pimelic acid, suberic acid, azelaic acid, sebacic acid, undecanedioic acid, and dodecanedioic acid; alicyclic dicarboxylic acids, such as 1,4-cyclohexane dicarboxylic acid; other aliphatic dicarboxylic acids, such as dimer acids; and aromatic dicarboxylic acids such as terephthalic acid, isophthalic acid, orthophthalic acid, xylylene dicarboxylic acid, and naphthalene dicarboxylic acid, and $C_{4-20}$ α,ω-linear aliphatic dicarboxylic acids are preferable, adipic acid and sebacic acid are more preferable, and from the perspective of obtaining favorable barrier performance, adipic acid is even more preferable.

Furthermore, the xylylene group-containing polyamide resin preferably contains at least 50 mol %, more preferably at least 70 mol %, even more preferably from 80 to 100 mol %, and yet even more preferably from 90 to 100 mol % of a constituent unit derived from adipic acid from among the constituent units derived from dicarboxylic acid (dicarboxylic acid units).

In other words, the polyamide resin (Y) preferably includes a constituent unit derived from a diamine and a constituent unit derived from a dicarboxylic acid with 50 mol % or greater of the constituent unit derived from a diamine being a constituent unit derived from xylylene diamine and 50 mol % or greater of the constituent unit derived from a dicarboxylic acid being a constituent unit derived from adipic acid, and more preferably has a constituent unit derived from a diamine and a constituent unit derived from a dicarboxylic acid with 80 mol % or greater of the constituent unit derived from a diamine being a constituent unit derived from xylylene diamine and 80 mol % or greater of the constituent unit derived from a dicarboxylic acid being a constituent unit derived from adipic acid.

The xylylene diamine is preferably meta-xylylene diamine.

Furthermore, the remaining dicarboxylic acid units excluding adipic acid are preferably constituent units derived from $C_{4-20}$ α,ω-linear aliphatic dicarboxylic acids.

Furthermore, examples of the preferred xylylene group-containing polyamide resin are polyamide resins in which 70 mol % or greater of the diamine units are constituent units derived from xylylene diamine (preferably meta-xylylene diamine), from 70 to 99 mol % of the dicarboxylic acid units are constituent units derived from adipic acid, and from 1 to 30 mol % of the dicarboxylic acid units are constituent units derived from isophthalic acid. The polyamide resin is more preferably a polyamide resin in which 80 mol % or greater of the diamine units are constituent units derived from meta-xylylene diamine (preferably meta-xylylene diamine), from 80 to 99 mol % of the dicarboxylic acid units are constituent units derived from adipic acid, and from 1 to 20 mol % of the dicarboxylic acid units are constituent units derived from isophthalic acid.

Adding an isophthalic acid unit as a dicarboxylic acid unit reduces the melting point, and as a result, the molding processing temperature can be lowered, and therefore thermal deterioration during molding can be suppressed, and stretching moldability is improved by delaying the crystallization time.

Furthermore, besides the above-mentioned diamines and dicarboxylic acids, lactams such as ε-caprolactam and laurolactam; aliphatic aminocarboxylic acids such as aminocaproic acid and aminoundecanoic acid; and aromatic aminocarboxylic acids such as p-aminomethylbenzoic acid can also be used as components constituting the xylylene group-containing polyamide resin, within a range that does not impair the effect of the present invention.

The xylylene group-containing polyamide resin is preferably manufactured by a polycondensation reaction (hereinafter, also referred to as "melt polycondensation") in a molten state. For example, the xylylene group-containing polyamide resin is preferably manufactured by a method in which a nylon salt composed of a diamine and a dicarboxylic acid is heated using a pressurization method in the presence of water, and is polymerized in a molten state while removing the water. In addition, the xylylene group-containing polyamide resin may also be manufactured by a method in which the diamine is added directly to molten dicarboxylic acid, and the contents are polycondensed under atmospheric pressure. In this case, in order to maintain the reaction system in a uniform liquid state, preferably, the diamine is continuously added to the dicarboxylic acid, and during that time, polycondensation is allowed to proceed while increasing the temperature of the reaction system such that the reaction temperature does not fall below the melting points of the produced oligoamide and polyamide. Furthermore, the molecular weight of the xylylene group-containing polyamide can also be increased by further subjecting the product obtained through melt polycondensation to solid phase polymerization as necessary.

The xylylene group-containing polyamide resin is preferably subjected to polycondensation in the presence of a phosphorus atom-containing compound. When the xylylene group-containing polyamide resin is subjected to polycondensation in the presence of a phosphorus atom-containing compound, the processing stability during melt molding is enhanced, and coloration is readily suppressed.

The phosphorous atom-containing compound is preferably a hypophosphorous acid compound or a phosphorous acid compound, and is more preferably a hypophosphorous acid compound.

The phosphorus atom-containing compound is preferably an organic metal salt, and of these, alkali metal salts are more preferable.

From the perspective of promoting a polymerization reaction and the perspective of preventing coloration, examples of the hypophosphorous acid compound include hypophosphorous acid, metal hypophosphites, metal phenyl phosphonites, ethyl hypophosphite, dimethyl phosphinic acid, phenyl methyl phosphinic acid, phenyl phosphonous acid, and ethyl phenyl phosphonite, and metal hypophosphites are preferable.

Examples of the metal hypophosphites include sodium hypophosphite, potassium hypophosphite, lithium hypophosphite, and calcium hypophosphite, and sodium hypophosphite is more preferable.

Examples of the metal phenyl phosphonites include sodium phenyl phosphonite, potassium phenyl phosphonite, and lithium phenyl phosphonite.

Examples of the phosphorous acid compound include phosphorous acid, pyrophosphorous acid, metal phosphites, metal phenyl phosphonates, triethyl phosphite, triphenyl phosphite, ethyl phosphonic acid, phenyl phosphonic acid, and diethyl phenyl phosphonate.

Examples of the metal phosphites include sodium hydrogen phosphite, sodium phosphite, potassium phosphite, and calcium phosphite.

Examples of the metal phenyl phosphonates include sodium ethylphosphonate, potassium ethylphosphonate, sodium phenylphosphonate, potassium phenylphosphonate, and lithium phenylphosphonate.

The phosphorus atom-containing compound may be one type, or two or more types may be used in combination.

Furthermore, polycondensation of the xylylene group-containing polyamide resin is preferably implemented in the presence of a phosphorus atom-containing compound and an alkali metal compound. When the usage amount of the phosphorus atom-containing compound is large, there is a concern that the polyamide resin may form a gel. Therefore, from the viewpoint of adjusting the rate of the amidation reaction, an alkali metal compound preferably coexists with the phosphorus atom-containing compound.

Examples of the alkali metal compound include alkali metal hydroxides and alkali metal acetates. Examples of the alkali metal hydroxide include lithium hydroxide, sodium hydroxide, potassium hydroxide, rubidium hydroxide, and cesium hydroxide, and examples of the alkali metal acetate include lithium acetate, sodium acetate, potassium acetate, rubidium acetate, and cesium acetate.

When an alkali metal compound is used in polycondensation of the polyamide resin, from the viewpoint of suppressing the formation of a gel, the usage amount of the alkali metal compound is in a range in which a value obtained by dividing the number of moles of the alkali metal compound by the number of moles of the phosphorus atom-containing compound is preferably from 0.5 to 1, more preferably from 0.55 to 0.95, and even more preferably from 0.6 to 0.9.

The number average molecular weight of the polyamide resin is selected, as appropriate, according to the application and molding method of the multilayer container, but from the perspectives of moldability and strength of the multilayer container, the number average molecular weight is preferably from 10000 to 60000, and more preferably from 11000 to 50000.

Note that the number average molecular weight of the polyamide resin is calculated from the following equation (X).

$$\text{Number average molecular weight} = 2 \times 1000000 / ([COOH] + [NH_2]) \quad (X)$$

(where [COOH] represents the terminal carboxyl group concentration (µmol/g) in the polyamide resin, and [NH$_2$] represents the terminal amino group concentration (µmol/g) in the polyamide resin.)

Here, the terminal amino group concentration is a value that is calculated by using a diluted hydrochloric acid aqueous solution to neutralize and titrate a solution obtained by dissolving the polyamide resin in a phenol/ethanol mixed solution, and the terminal carboxyl group concentration is a value that is calculated by using an aqueous sodium hydroxide solution to neutralize and titrate a solution obtained by dissolving the polyamide in benzyl alcohol.

The content of the polyamide resin (Y) contained in the polyamide layer is from 0.05 to 7.0 mass % relative to the total amount of all polyamide layers and all polyester layers. From the perspectives of gas barrier properties and suppressing yellowing of the recycled polyester, the content thereof is preferably from 0.5 to 6.0 mass %, more preferably from 1.0 to 5.0 mass %, and even more preferably from 1.5 to 4.5 mass %.

(Yellowing Inhibitor (A))

The polyamide layer of the multilayer container contains a yellowing inhibitor (A). The yellowing inhibitor (A) is a dye, and the content of the yellowing inhibitor (A) is from 1 to 30 ppm relative to the total amount of all polyamide layers and all polyester layers.

The content of the yellowing inhibitor (A) is from 1 to 30 ppm relative to the total amount of all polyamide layers and all polyester layers. From the perspective of effectively suppressing yellowing of the recycled polyester, the content thereof is preferably from 1.5 to 25 ppm, and from the perspective of mixability and moldability during manufacturing, the content thereof is more preferably from 2 to 22 ppm, even more preferably from 3 to 20 ppm, and yet even more preferably from 8 to 20 ppm.

Note that "ppm" in the present invention indicates parts per million by mass.

From the perspective of effectively suppressing yellowing of the recycled polyester, the content of the yellowing inhibitor (A) in the polyamide layer is preferably from 0.001 to 1.0 mass %, more preferably from 0.005 to 0.5 mass %, even more preferably from 0.008 to 0.1 mass %, yet even more preferably from 0.01 to 0.08 mass %, and still even more preferably from 0.03 to 0.08 mass %.

From the perspective of transparency, the yellowing inhibitor (A) is a dye, and of the dyes, a blue dye is preferable.

Yellowing of the recycled polyester obtained from the multilayer container of the present invention can be suppressed by using an extremely small amount of a dye. Further, a recycled polyester having excellent transparency can be obtained.

Here, a "dye" is a colorant that is soluble in a solvent.

Examples of the dye include anthraquinone-based dyes, pyrazolone-based dyes, coumarin-based dyes, perinone-based dyes, methine-based dyes, and quinophthalone-based dyes, and anthraquinone-based dyes are preferable.

Examples of the anthraquinone-based dyes include anthraquinone-based dyes in which a hydrogen atom of the aromatic ring is substituted with an aromatic amine, an aliphatic amine, or a halogen, and an anthraquinone-based dye in which a hydrogen atom of the aromatic ring is substituted with an aromatic amine is preferable. Yellowing of the recycled polyester can be suppressed by using such an anthraquinone-based dye. The anthraquinone-based dye is preferably an anthraquinone-based dye in which a hydrogen atom of the aromatic ring is not substituted with a hydroxyl group. By using such an anthraquinone-based dye, a high oxygen barrier property is obtained in the multilayer container of the present invention.

Yellowing of the recycled polyester obtained from the multilayer container of the present invention can be suppressed by using an extremely small amount of an anthraquinone-based dye.

The anthraquinone-based dye is more preferably an anthraquinone-based blue dye.

The anthraquinone-based dye is preferably a compound represented by Formula (1) below.

[Chem. 5]

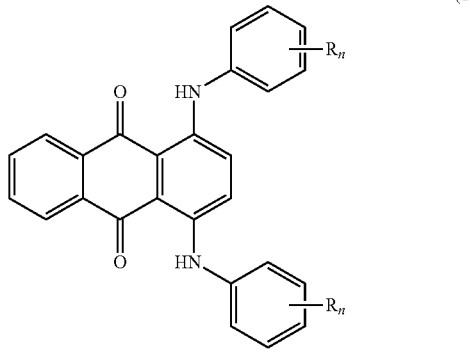

(1)

(Where n represents the number of R, and the two n are each independently from 1 to 5. Each R of the quantity of 2n independently represents a $C_{1-4}$ alkyl group.)

In Formula (1), n is from 1 to 5, preferably from 2 to 5, and more preferably from 2 to 3. Yellowing ($\Delta b^*$ value) of the recycled polyester can be suppressed by setting n to the range described above. Each R is independently a $C_{1-4}$ alkyl group, and is preferably at least one selected from the group consisting of a methyl group and an ethyl group. R is preferably substituted at least at the ortho position or the para position relative to the amino group, is preferably substituted at least at the para position, is more preferably substituted at least at the ortho position, and is even more preferably substituted at the ortho position and the para position.

Specific examples of the compounds represented by Formula (1) include 1,4-bis[(2-ethyl-6-methylphenyl)amino] anthraquinone, Solvent Blue 97, Solvent Blue 104, and Solvent Green 3, and 1,4-bis[(2-ethyl-6-methylphenyl) amino] anthraquinone, Solvent Blue 97, and Solvent Blue 104 are preferable.

Examples of commercially available products of the yellowing inhibitor (A) include MACROLEX Blue 3R (1,4-bis[(2-ethyl-6-methylphenyl)amino]anthraquinone, anthraquinone-based dye, available from Lanxess AG), MACROLEX Blue RR Gran (anthraquinone-based dye, available from Lanxess AG), Oracet Blue 690 (anthraquinone-based dye, available from BASF SE), and Quinizarin Green SS (anthraquinone-based dye, available from Tokyo Chemical Industry Co., Ltd.).

(Oxidation Accelerator (B))

In the multilayer container of the present invention, the polyamide layer contains an oxidation accelerator (B) for the purpose of inducing an oxidation reaction of the polyamide resin (Y) to increase the oxygen absorption function and further enhance the gas barrier properties.

The oxidation accelerator (B) is preferably a compound containing a transition metal, and is more preferably at least one selected from the group consisting of simple transition metal substances, oxides, inorganic acid salts, organic acid salts, and complexes.

Examples of the inorganic acid salts include carbonates, sulfates, nitrates, phosphates, silicates, and halides such as chloride and bromide.

Examples of the organic acid salts include carboxylates, sulfonates, and phosphonates.

Examples of the complexes include complexes with a β-diketone or a β-keto acid ester.

The transition metal is preferably a Group VIII transition metal of the periodic table of elements, and from the perspective of expressing oxygen absorption performance, the transition metal is more preferably at least one selected from the group consisting of cobalt, iron, manganese, and nickel, and is even more preferably cobalt.

From the perspective of favorably expressing oxygen absorption performance, among the compounds containing a transition metal, the compound is preferably one selected from the group consisting of transition metal-containing carboxylates, carbonates, acetylacetonate complexes, oxides and halides, is more preferably at least one selected from octanoates, neodecanoates, naphthenates, stearates, acetates, carbonates, and acetylacetonate complexes, and is even more preferably a cobalt carboxylate such as cobalt octanoate, cobalt naphthenate, cobalt acetate, cobalt neodecanoate, and cobalt stearate.

One type of the oxidation accelerator (B) may be used alone, or two or more types may be used in combination.

From the perspectives of increasing gas barrier properties and suppressing yellowing of the recycled polyester resin, the content of the oxidation accelerator (B) is preferably from 0.0001 to 1.0 mass %, more preferably from 0.01 to 0.8 mass %, and even more preferably from 0.05 to 0.6 mass %, relative to the polyamide layer.

Additionally, from the perspectives of increasing gas barrier properties and suppressing yellowing of the recycled polyester resin, the content of the oxidation accelerator (B) is preferably from 0.0001 to 1.0 parts by mass, more preferably from 0.01 to 0.8 parts by mass, and even more preferably from 0.05 to 0.6 parts by mass, relative to 100 parts by mass of the polyamide resin (Y).

Moreover, from the perspectives of increasing gas barrier properties and suppressing yellowing of the recycled polyester resin, the content of the transition metal of the oxidation accelerator (B) is preferably from 0.00001 to 0.1 mass %, more preferably from 0.0001 to 0.08 mass %, and even more preferably from 0.0003 to 0.06 mass %, relative to the polyamide layer.

Further, from the perspectives of increasing gas barrier properties and suppressing yellowing of the recycled polyester resin, the content of the transition metal of the oxidation accelerator (B) is preferably from 0.00001 to 0.1 parts by mass, more preferably from 0.0001 to parts by mass, and even more preferably from 0.0003 to 0.06 parts mass, relative to 100 parts by mass of the polyamide resin (Y). Note that when a carboxylate containing a transition metal is used as the oxidation accelerator (B), the content of the transition metal refers to the content of the transition metal itself in the compound containing the transition metal.

(Greening Inhibitor (C))

The polyamide layer of the multilayer container preferably contains a greening inhibitor (C).

The greening inhibitor (C) suppresses green color in a −a* direction as measured with a color difference meter when the multilayer container of the present invention is recycled to obtain recycled polyester.

The content of the greening inhibitor (C) is from 1 to 30 ppm relative to the total amount of all polyamide layers and all polyester layers. From the perspective of effectively suppressing greening of the recycled polyester, the content thereof is preferably from 1.5 to 25 ppm, and from the perspectives of mixability and moldability during manufacturing, the content thereof is more preferably from 2 to 22 ppm, and even more preferably from 3 to 20 ppm.

Note that "ppm" in the present invention indicates parts per million by mass.

From the perspective of effectively suppressing greening of the recycled polyester, the content of the greening inhibitor (C) in the polyamide layer is preferably from 0.001 to 1.0 mass %, more preferably from 0.005 to 0.5 mass %, even more preferably from 0.008 to 0.1 mass %, and yet even more preferably from 0.01 to 0.08 mass %.

A mass ratio [(A)/(C)] of the yellowing inhibitor (A) to the greening inhibitor (C) in the polyamide layer of the multilayer container of the present invention is preferably from 20/80 to more preferably from 30/70 to 70/30, and even more preferably from 40/60 to 60/40.

When the mass ratio is within this range, the hue change of the recycled polyester obtained after recycling is small, and in particular, a polyester having excellent achromaticity is obtained.

The greening inhibitor (C) is preferably a dye from the perspective of transparency.

Among the dyes, the greening inhibitor (C) is preferably at least one selected from the group consisting of anthraquinone-based dyes and azo-based dyes, and from the perspective of thermal resistance, an anthraquinone-based dye is more preferable.

Here, a "dye" is a colorant that is soluble in a solvent.

The anthraquinone-based dye is preferably an anthraquinone-based dye in which a hydrogen atom of the aromatic ring is not substituted with a hydroxyl group. By using such an anthraquinone-based dye, a high oxygen gas barrier property is obtained in the multilayer container of the present invention.

Furthermore, the greening inhibitor (C) is preferably a red dye, is more preferably at least one selected from the group consisting of anthraquinone-based red dyes and azo-based red dyes, and from the perspective of thermal resistance, is even more preferably an anthraquinone-based red dye.

Greening of the recycled polyester obtained from the multilayer container of the present invention can be suppressed by using an extremely small amount of an anthraquinone-based red dye and an azo-based red dye.

The anthraquinone-based dye is preferably a compound represented by Formula (2) below.

[Chem. 6]

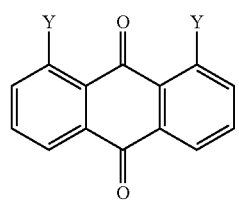

(2)

-continued

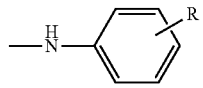

(2a)

(In Formula (2), the two Y are each independently a hydrogen atom or a group represented by Formula (2a). However, at least one Y is a group represented by Formula (2a).

Furthermore, in Formula (2a), R represents a $C_1$-4 alkyl group.)

In Formula (2), each of the two Y independently represents a hydrogen atom or a group represented by Formula (2a), but at least one Y is a group represented by Formula (2a). Preferably, one Y is a group represented by Formula (2a), and the other Y is a hydrogen atom.

In Formula (2a), R represents a $C_1$-4 alkyl group and is preferably at least one selected from the group consisting of a methyl group and an ethyl group. Note that when the two Y are both groups represented by Formula (2a), the two R in the groups represented by Formula (2a) may be the same or different. R is preferably substituted at the para position with respect to the amino group.

Specific examples of the compound represented by Formula (2) include Solvent Violet 36.

One type of the greening inhibitor (B) may be used alone, or two or more types may be used in combination.

Examples of commercially available products of the greening inhibitor (B) include MACROLEX Violet 3R Gran (anthraquinone-based dye, available from Lanxess AG), MACROLEX Red Violet R Gran (Disperse Violet 31, Disperse Violet 26, Solvent Violet 59, anthraquinone-based dye, available from Lanxess AG), MACROLEX RED 5B Gran (Disperse Violet 31, Disperse Violet 26, Solvent Violet 59, anthraquinone-based dye, available from Lanxess AG), and MACROLEX Red B (Solvent Red 195, azo-based dye, available from Lanxess AG).

(Polyester Resin (Z))

The polyamide layer of the multilayer container preferably contains a polyester resin (Z) from the perspectives of suppressing yellowing of the recycled polyester and improving the impact resistance.

The polyester resin (Z) used in the polyamide layer is preferably a polyester resin described in the Polyester resin (X) section describing polyester resins (X) contained in the polyester layer, and the same applies to suitable polyester resins.

Specifically, the polyester resin (Z) is preferably polyethylene terephthalate (PET). The polyethylene terephthalate may include a constituent unit derived from an aromatic dicarboxylic acid other than terephthalic acid, and as the constituent unit derived from an aromatic dicarboxylic acid other than terephthalic acid, a constituent unit derived from a sulfophthalic acid or a metal sulfophthalate is preferable. The metal sulfophthalate is a metal salt of a sulfophthalic acid, and examples of the metal atom include alkali metals and alkaline earth metals.

When the polyester resin (Z) is contained in the polyamide layer, yellowing of the recycled polyester obtained by recycling is suppressed, and impact resistance of the multilayer container becomes favorable because adhesiveness between the polyamide layer and the polyester layer is improved.

(Other Components)

The polyamide layer may contain other components. Examples of the other components include thermal stabilizers, photostabilizers, moisture-proof agents, waterproofing agents, lubricants, and spreading agents.

The polyamide layer may contain, within a range that does not impair the effects of the present invention, a resin other than the polyamide resin (Y) that is the main component.

In particular, when the yellowing inhibitor (A) is mixed by the masterbatch method described below, it is preferable to contain the polyamide resin or polyester resin used in the masterbatch. In this case, the content of the polyamide resin or polyester resin used in the masterbatch is preferably from 1 to 20 mass % and more preferably from 3 to 15 mass % relative to the amount of resin in the entire polyamide layer.

(Resin Composition in Polyamide Layer)

From the perspective of gas barrier properties, the content of the polyamide resin (Y) in the polyamide layer is preferably from 80 to 100 mass %, and more preferably from 90 to 100 mass % relative to the amount of resin in the entire polyamide layer.

Also, when the polyester resin (Z) is contained in the polyamide layer, from the perspectives of impact resistance and gas barrier properties, the content of the polyester resin (Z) in the polyamide layer is preferably from 5 to 70 mass %, more preferably from 10 to 65 mass %, even more preferably from 20 to 65 mass %, and still even more preferably from 40 to 65 mass %. When the content of the polyester resin (Z) is within the range described above, the multilayer container of the present invention suppresses yellowing of the recycled polyester obtained through recycling, adhesiveness between the polyamide layer and the polyester layer is improved, and the impact resistance is excellent.

<Multilayer Container Structure and Characteristics>

The multilayer container of the present invention has a multilayer structure including a polyester layer containing the polyester resin (X), and a polyamide layer containing the polyamide resin (Y), the yellowing inhibitor (A), and the oxidation accelerator (B).

A resin layer other than the polyester layer and the polyamide layer may be included in the multilayer container of the present invention, but from the perspectives of facilitating separation during recycling and improving the yellowing suppression effect, the content of the resin layer other than the polyester layer and the polyamide layer is preferably low, and more preferably, the multilayer container of the present invention is substantially free of a resin layer other than the polyester layer and the polyamide layer. Additionally, an adhesive layer made from an adhesive or an inorganic layer made from an inorganic material may be provided, but from the perspectives of facilitating separation during recycling and improving the yellowing suppression effect, the content of the adhesive layer or the inorganic layer is preferably low, and more preferably, the multilayer container of the present invention is substantially free of an adhesive layer or an inorganic layer.

The multilayer container of the present invention preferably has a multilayer structure of two or more layers, preferably has a structure of from two to five layers, more preferably has a structure of from three to five layers, even more preferably has a three layer structure or a five layer structure, and yet even more preferably has a three layer structure.

The outermost layer of the multilayer container of the present invention is preferably a polyester layer. Furthermore, the innermost layer is also preferably a polyester layer, and more preferably the outermost layer and the innermost layer are both polyester layers.

When the outermost layer is a polyester layer, the multilayer container excels in impact resistance, appearance and design properties.

Here, the "outermost layer" is the layer present on the outer surface of the multilayer container, and is a layer in contact with a packaging material, a gripping tool, or the like during transportation, and is a layer associated with the appearance of the container. The "innermost layer" is the layer present on the inner surface of the multilayer container, and is a layer in contact with the contents, preferably a liquid.

Therefore, as the structure of the multilayer container, the multilayer container preferably has a structure of from two to five layers with the outermost layer being a polyester layer, and more preferably has a structure of from three to five layers with the outermost layer and the innermost layer being polyester layers.

In the case of a two-layer structure, the structure is preferably, in order from the innermost layer, a polyamide layer/polyester layer, in the case of a three-layer structure, the structure is preferably, in order from the innermost layer, a polyester layer/polyamide layer/polyester layer, and in the case of a five-layer structure, the structure is preferably, in order from the innermost layer, a polyester layer/polyamide layer/polyester layer/polyamide layer/polyester layer.

The multilayer container of the present invention is preferably a hollow container, and when the multilayer container is a hollow container, the trunk section thereof has at least a multilayer structure. A ratio (thickness ratio W/S) of a thickness (W) of the polyester layer to a thickness (S) of the polyamide layer of the trunk section is preferably from 2.5 to 200. Note that the thickness of the polyester layer refers to the average thickness, and when a plurality of polyester layers are present in the trunk section, the thicknesses of the plurality of layers are averaged, and the average thickness per layer is determined. The same applies to the thickness of the polyamide layer.

The thickness ratio W/S is preferably 2.5 or greater because at such ratio, the polyamide resin is easily separated from the polyester resin in a separation step of a method for manufacturing recycled polyester, and particularly in air elutriation or specific gravity separation. When the thickness ratio W/S is 200 or less, the gas barrier properties of the hollow container are excellent, and the contents can be stored for a long period of time.

From the perspective of improving the gas barrier properties of the hollow container while increasing the separation ease in the separation step, the thickness ratio (W/S) is more preferably from 3 to 50, and even more preferably from 4 to 15.

Additionally, when the multilayer container is a hollow container, the total thickness of the trunk section of the hollow container (that is, the total thickness of all layers of the trunk section) is preferably from 100 μm to 5 mm, more preferably from 150 μm to 3 mm, and even more preferably from 200 μm to 2 mm. Additionally, the thickness (W) of each polyester layer is preferably from 30 μm to 2 mm, more preferably from 40 μm to 1 mm, and even more preferably from 50 μm to 500 μm. The thickness (S) of each polyamide layer is preferably from 1 to 200 μm, more preferably from 3 to 100 μm, and even more preferably from 8 to 50 μm. In the present invention, when the thickness of the polyamide layer is within this range, the polyamide layer is easily separated from the polyester in a separation step while ensuring gas barrier properties.

When the multilayer container is a hollow container, from the perspective of obtaining favorable gas barrier properties, the polyamide layer is preferably present at 50% or greater of the surface area of the outer surface of the container, is more preferably present at 70% or greater of the surface area of the outer surface of the container, is even more preferably present at 90% or greater of the surface area of the outer surface of the container, is yet even more preferably present at 99% or greater of the surface area of the outer surface of the container, is still even more preferably present substantially at 100% of the surface area of the outer surface of the container, and is still even more preferably present at 100% of the surface area of the outer surface of the container.

When the multilayer container of the present invention is a hollow container, the multilayer container is preferably a liquid packaging container used by filling the inside of the hollow container with a liquid, and is even more preferably a beverage packaging container. Examples of the liquid to be filled inside include beverages, liquid seasonings, chemicals, pharmaceuticals, and detergents, and beverages for which deterioration due to oxygen can be effectively prevented by the multilayer container of the present invention are preferable.

Examples of the beverages include water, carbonated water, oxygenated water, hydrogen water, milk, milk products, juices, coffee, coffee beverages, carbonated soft drinks, teas, and alcoholic beverages.

Examples of the liquid seasonings include sauces, soy sauce, syrups, rice wine seasonings, and dressings.

Examples of the chemicals include agricultural chemicals and pesticides.

The oxygen barrier property of the multilayer container of the present invention can be evaluated through an oxygen permeability test by the MOCON method in accordance with ASTM D3985. The oxygen permeability (cc/(bottle·0.21 atm·day)) of the multilayer container of the present invention is preferably 0.020 or less, more preferably 0.010 or less, and even more preferably 0.005 or less when a total amount of 25 g of resin is formed into a three-layer hollow container having an internal volume of 500 mL with a mass ratio of the polyester layer to the polyamide layer being 97:3. Note that the three-layer hollow container can be manufactured according to the method described in the examples.

For the measurements, the OX-TRAN 2/61 available from MOCON, Inc. is used. The 500 mL container is filled with 100 mL of water, nitrogen at 1 atm is circulated inside the container at a rate of 20 mL/min under conditions including an oxygen partial pressure of 0.21 atm, a temperature of 23° C., a container internal humidity of 100% RH, and an external humidity of 50% RH, and oxygen contained in the nitrogen after circulating inside the container is detected by a coulometric sensor, and thereby the oxygen permeability is measured.

[Method for Manufacturing Multilayer Container]

The method for manufacturing the multilayer container of the present invention is not particularly limited, but the multilayer container thereof is preferably manufactured by the following method.

The method for manufacturing the multilayer container of the present invention is preferably a method for manufacturing a multilayer container including: a polyester layer containing a polyester resin (X); and a polyamide layer containing a polyamide resin (Y), a yellowing inhibitor (A), and an oxidation accelerator (B); the content of the polyamide resin (Y) being from 0.05 to 7.0 mass % relative to the total amount of all polyamide layers and all polyester layers; the yellowing inhibitor (A) being a dye; and the content of the yellowing inhibitor (A) being from 1 to 30 ppm relative to the total amount of all polyamide layers and all polyester layers; and the manufacturing method including: a step 1 of mixing the polyamide resin (Y), the yellowing inhibitor (A), and the oxidation accelerator (B) to prepare a polyamide resin mixture; a step 2 of co-injection molding the polyamide resin mixture and a polyester resin composition containing the polyester resin (X), and thereby obtaining a multilayer preform; and a step 3 of blow molding the multilayer preform.

<Step 1 (Step of Preparing Polyamide Resin Mixture)>

In step 1, the polyamide resin (Y), the yellowing inhibitor (A), and the oxidation accelerator (B) are mixed to prepare a polyamide resin mixture.

Typically, equipment for stirring and mixing or kneading the yellowing inhibitor and all the resins is necessary in order to spread the yellowing inhibitor throughout the container. However, in the method for manufacturing a multilayer container of the present invention, the yellowing inhibitor (A) and the oxidation accelerator (B) are mixed into a small amount of the polyamide resin (Y), and thereby the yellowing inhibitor (A) and the oxidation accelerator (B) can be efficiently spread throughout the entire container by mixing on a small scale for a short period of time, and thus the manufacturing method of the present invention excels in productivity.

The method of mixing these materials may be dry blending or melt blending (melt kneading), but from the perspectives of reducing the thermal history and preventing degradation of the resin or yellowing inhibitor, dry blending and melt blending with the masterbatch method are preferable. Further, from the perspective of preventing the yellowing inhibitor from adhering to and remaining on a molding machine or around the molding machine in step 2, melt blending is preferable, and of the melt blending techniques, the masterbatch method is preferable from the perspective of reducing the thermal history and preventing degradation of the resin and yellowing inhibitor.

In step 1, the pellet-shaped polyamide resin (Y), the yellowing inhibitor (A), and the oxidation accelerator (B) are preferably mixed at a temperature of 230° C. or lower, are more preferably mixed at a temperature of 150° C. or lower, and are even more preferably mixed at a temperature of 100° C. or lower. When mixing is implemented at a temperature of 230° C. or lower, the thermal history can be reduced, and degradation of the resin or yellowing inhibitor can be prevented. It is thought that this is achieved because the polyamide resin can maintain the pellet shape, and therefore thermal degradation is minimal. Dry blending is preferably implemented when mixing at a temperature of 230° C. or lower.

The yellowing inhibitor (A) suitably used in step 1 is the same as the yellowing inhibitor (A) described in the Yellowing inhibitor (A) section, is a dye, and is more preferably an anthraquinone-based dye.

Furthermore, the yellowing inhibitor (A) is preferably in the form of a powder, a dispersion, or a solution, and is more preferably in the form of a powder. The yellowing inhibitor (A) in these forms can be more easily and uniformly mixed with the polyamide resin (Y).

The oxidation accelerator (B) suitably used in step 1 is the same as the oxidation accelerator (B) described in the Oxidation accelerator (B) section. Specifically, the oxidation accelerator (B) is preferably a compound containing a transition metal, is preferably one selected from the group consisting of transition metal-containing carboxylates, carbonates, acetylacetonate complexes, oxides and halides, is more preferably at least one selected from octanoates, neodecanoates, naphthenates, stearates, acetates, carbonates, and acetylacetonate complexes, and is even more preferably a cobalt carboxylate such as cobalt octanoate, cobalt naphthenate, cobalt acetate, cobalt neodecanoate, and cobalt stearate.

In addition, the greening inhibitor (C) is preferably further mixed in step 1.

The greening inhibitor (C) suitably used in step 1 is the same as the greening inhibitor described in the above Greening inhibitor (C) section, and is preferably at least one selected from the group consisting of dyes and pigments, is more preferably at least one selected from the group consisting of anthraquinone-based dyes and azo-based dyes, is even more preferably at least one selected from the group consisting of anthraquinone-based red dyes and azo-based red dyes, and from the perspective of thermal resistance, is yet even more preferably an anthraquinone-based red dye.

Furthermore, the greening inhibitor (C) is preferably in the form of a powder, a dispersion, or a solution, and is more preferably in the form of a powder. The greening inhibitor (C) in these forms can be more easily and uniformly mixed with the polyamide resin (Y).

Furthermore, the polyester resin (Z) is preferably mixed in step 1.

The polyester resin (Z) suitably used in step 1 is the same as the polyester resin (Z) described in the Polyester resin (Z) section. When mixed by dry blending, the polyester resin (Z) is preferably mixed in a pellet form.

Examples of the mixing device used in the dry blending include a tumbler mixer, a ribbon mixer, a Henschel mixer, and a Banbury mixer.

Examples of the method for mixing the polyamide resin (Y), the yellowing inhibitor (A), and the oxidation accelerator (B) by melt blending in step 1 include the masterbatch method and a full compounding method, and the masterbatch method is preferable.

The masterbatch method is a method of kneading a polyamide resin or polyester resin with the yellowing inhibitor (A) and the oxidation accelerator (B), and then mixing with the polyamide resin (Y) in step 1.

The masterbatch method is a method of kneading a small amount of polyamide resin or polyester resin with the yellowing inhibitor (A) and the oxidation accelerator (B) to form a masterbatch, and then mixing the master batch with the remaining polyamide resin (Y) in step 1. Further, when obtaining a masterbatch, the greening inhibitor (C) can also be kneaded at the same time. In other words, preferably, in step 1, the polyamide resin or the polyester resin and the yellowing inhibitor (A) and the oxidation accelerator (B) are kneaded and then mixed with the polyamide resin (Y), and more preferably, in step 1, the polyamide resin or polyester resin, the yellowing inhibitor (A), the oxidation accelerator (B), and the greening inhibitor (C) are kneaded and then mixed with the polyamide resin (Y).

A polyamide resin or a polyester resin is preferably used in the masterbatch, and from the perspective of miscibility with the polyamide resin (Y), a polyamide resin is preferably used, and from the perspective of suppressing yellowing due to thermal history, a polyester resin is preferably used. Note that these materials may be mixed and used.

In particular, the yellowing inhibitor (A) is more preferably a masterbatch kneaded with a polyamide resin (a masterbatch containing a polyamide resin and a yellowing inhibitor (A); a polyamide resin composition), and the oxidation accelerator (B) is more preferably a masterbatch kneaded with a polyester resin (a masterbatch containing a polyester resin and an oxidation accelerator (B); a polyester resin composition). The greening inhibitor (C) is preferably a masterbatch kneaded with a polyamide resin (a masterbatch containing a polyamide resin, a yellowing inhibitor (A), and a greening inhibitor (C); a polyamide resin composition).

The polyamide resin used in the masterbatch is preferably a polyamide resin (Y), and is more preferably the same as the remaining polyamide resin (Y).

The polyester resin used in the masterbatch is preferably a polyester resin (Z). Also, a polyester resin that is the same as the polyester resin (X) may be used, or a polyester resin that is the same as the polyester resin (X) of the polyester layer may be used.

The amount of the polyamide resin or the polyester resin used in the masterbatch is preferably from 1 to 20 mass %, and more preferably from 3 to 15 mass % relative to the amount of resin in the entire polyamide layer.

When a polyamide resin or a polyester resin, the yellowing inhibitor (A), and the oxidation accelerator (B) are kneaded as the method for obtaining a masterbatch, if the melting point of the resin used in the masterbatch is denoted by Tm, the kneading temperature (° C.) is preferably from Tm+5 to Tm+60, more preferably from Tm+10 to Tm+50, and even more preferably from Tm+15 to Tm+40 from the perspective of sufficient mixing. Specifically, the kneading temperature is even more preferably from 245 to 300° C., yet even more preferably from 250 to 290° C., and still even more preferably from 255 to 280° C. In addition, from the perspective of sufficiently kneading, the kneading time is preferably from 10 to 600 seconds, more preferably from 20 to 400 seconds, and even more preferably from 30 to 300 seconds. Examples of the device used for kneading include an open type mixing roll, a non-open type device such as Banbury mixer, a kneader, and a continuous kneader (such as a single-screw kneader, a twin-screw kneader, and a multi-screw kneader).

Furthermore, examples of methods for mixing the masterbatch and the remaining polyamide resin (Y) include dry blending and a kneading method, and dry blending is preferable from the perspective of reducing the thermal history. For the dry blending, preferably pellets of the masterbatch are mixed with pellets of the remaining polyamide resin (Y) using a mixing device such as a tumbler mixer.

When a polyester resin (Z) is contained in the polyamide layer of the multilayer container to be obtained, examples of methods for mixing with the masterbatch, the remaining polyamide resin (Y), and the remaining polyester resin (Z) include dry blending and a kneading method, and dry blending is preferable. For the dry blending, preferably pellets of the masterbatch, pellets of the remaining polyamide resin (Y), and pellets of the remaining polyester resin (Z) are mixed using a mixing device such as a tumbler mixer.

The full compounding method is a method of kneading and mixing the total amount of the polyamide resin (Y), the yellowing inhibitor (A), and the oxidation accelerator (B) used in the polyamide layer.

Note that when a polyester resin (Z) is contained in the polyamide layer of the multilayer container to be obtained, the total amount of the polyamide resin (Y), the total amount of polyester resin (Z), the yellowing inhibitor (A), and the oxidation accelerator (B) used in the polyamide layer are kneaded and mixed.

From the perspective of sufficient mixing, the kneading temperature is preferably from 245 to 300° C., more preferably from 250 to 290° C., and even more preferably from 255 to 280° C. In addition, from the perspective of sufficiently kneading, the kneading time is preferably from 10 to 600 seconds, more preferably from 20 to 400 seconds, and even more preferably from 30 to 300 seconds. Examples of the device used for kneading include an open type mixing roll, a non-open type Banbury mixer, a kneader, and a continuous kneader (such as a single-screw kneader, a twin-screw kneader, and a multi-screw kneader).

The composition of the polyamide resin mixture obtained in this step is preferably a composition similar to that described in the Polyamide layer section above.

<Step 2 (Step of Obtaining Multilayer Preform)>

In step 2, the polyamide resin mixture and a polyester resin composition containing a polyester resin (X) are co-injection molded to obtain a multilayer preform.

The polyester resin composition is preferably a composition similar to that described in the Polyester layer section above.

Also, in the co-injection molding, the polyester resin and the polyamide resin mixture are extruded in molds, respectively, and then co-injection molded to form a multilayer preform.

<Step 3 (Blow Molding Step)>

In step 3, the multilayer preform is blow molded.

In the method for manufacturing a multilayer container of the present invention, the multilayer preform (multilayer parison) obtained in step 2 is preferably molded by stretch blowing.

Among these, in step 2, the multilayer preform obtained by co-injection molding is preferably stretch-blow molded, and more preferably, the multilayer preform obtained by co-injection molding is biaxially stretch-blow molded. The conditions for biaxial stretch-blow molding preferably include a preform heating temperature of from 95 to 110° C., a primary blow pressure of from 0.5 to 1.2 MPa, and a secondary blow pressure of from 2.0 to 2.6 MPa. The occurrence of uneven thickness and uneven stretching is suppressed through biaxial stretch-blow molding under these conditions, and therefore a multilayer container having excellent strength can be obtained.

[Method for Manufacturing Recycled Polyester]

The multilayer container of the present invention is suitable for recycling as described above, and recycled polyester can be manufactured using the multilayer container of the present invention as a raw material.

The method for manufacturing recycled polyester of the present invention preferably includes recovering polyester from the multilayer container.

That is, the method for manufacturing recycled polyester of the present invention preferably includes recovering polyester from a multilayer container that includes: a polyester layer containing a polyester resin (X); and a polyamide layer containing a polyamide resin (Y), a yellowing inhibitor (A), and an oxidation accelerator (B); the content of the polyamide resin (Y) being from 0.05 to 7.0 mass % relative to the total amount of all polyamide layers and all polyester layers; the yellowing inhibitor (A) being a dye, and the content of the yellowing inhibitor (A) being from 1 to 30 ppm relative to the total amount of all polyamide layers and all polyester layers.

The method for manufacturing recycled polyester from the multilayer container preferably includes removing all or a portion of the polyamide layer from the multilayer container, recovering the polyester constituting the polyester layer, and using the recovered polyester as recycled polyester. Note that the method for manufacturing recycled polyester from the multilayer container is not limited to the above-described method, and may be a method of manufacturing recycled polyester without passing through the step of removing the polyamide resin.

The recycled polyester obtained by the present manufacturing method can be used in various applications such as resin molded articles and fibers.

Details of the method for manufacturing recycled polyester of the present invention will be described below.

In the present manufacturing method, a used multilayer container is ordinarily used as the multilayer container, but an unused multilayer container may also be used. Examples of the used multilayer container include those that have been distributed in the market and then collected.

In the present manufacturing method, first, if a lid is attached to the multilayer container, the lid is preferably removed from the multilayer container.

Next, the container is ground, washed as needed, and then subjected to separation to selectively remove the polyester as needed, and thereby the polyester is recovered as recycled polyester (recovery step).

Next, if necessary, the polyester is granulated to obtain pellets (granulation step).

Further, if necessary, a crystallization step and a solid phase polymerization step are implemented (crystallization/solid phase polymerization step).

Each step is described below.

<Recovery Step>

The recovery step is a step of grinding the multilayer container to recover recycled polyester.

In this step, after the multilayer container is ground, preferably, all or a portion of the polyamide layer is removed, and the polyester is selectively retrieved, and more preferably, the polyester and the polyamide resin constituting the polyamide layer are separated.

The multilayer container can be ground using a grinder such as a single-screw grinder, a twin-screw grinder, a three-screw grinder, or a cutter mill. The ground product obtained by grinding is formed into, for example, a flake shape, a powdered shape, or a bulk shape. However, a large portion of the multilayer container has a thin multilayer laminated structure with a thickness of several mm or less, such as the trunk section, and therefore most of the ground product is ordinarily flake-shaped. Note that the flake-shaped ground product refers to a flaky or flat shaped product having a thickness of approximately 2 mm or less.

Additionally, in the multilayer container, the polyester layer and the polyamide layer are structurally integrated, but these layers are usually not adhered to each other, and in the grinding step, the polyester and the polyamide resin are easily separated as separate ground products. In addition, by forming the ground product in flake shapes, the ground product is more likely to be blown up and separated by the air flow of the air elutriation described below.

However, the polyester and the polyamide resin are not necessarily materials that can be completely separated in the grinding step, and the ground product is separated into a ground product having a relatively high content percentage of polyester and a ground product having a relatively low content percentage of polyester resin and a relatively high content percentage of polyamide. Note that in the following, for convenience of explanation, the ground product having a relatively high content percentage of polyester is referred to simply as polyester, and the ground product having a relatively high content percentage of polyamide resin is referred to simply as polyamide resin.

The ground product that has been ground as described above is separated into polyester and polyamide resins (separation step).

As the separation method, specific gravity sorting using the difference in the specific gravities of the polyester and the polyamide resins is preferably used.

In other words, the polyamide layer is preferably removed by air elutriation after the multilayer container has been ground.

A specific example of specific gravity sorting is air elutriation in which the ground product is sorted through wind force. An example of air elutriation includes a method in which the ground product is subjected to an airflow generated by a separation device that can internally generate a rotating airflow, and the ground product is separated into: a ground product that has a large specific gravity or a small specific surface area and naturally descends due to the weight of the ground product itself; and a ground product that has a small specific gravity or a large specific surface area and is blown upward by the airflow, and the separated ground products are recovered.

With this method, the ground product of polyester naturally descends under its own weight, whereas the ground product of the polyamide resin is blown upward, and through this, the polyester and polyamide resin can be separated and recovered.

In this type of air elutriation, a similar operation may be repeated for the same ground product. For example, the naturally descended ground product may be once again subjected to air elutriation to increase the content percentage of polyester in the recycled polyester.

Note that the separation method is not limited to air elutriation, and other examples include a method of immersing the ground product in a liquid such as water and separating based on differences in specific gravity of the ground product with respect to the liquid, and a method of applying a constant level of vibration to the ground product and separating ground products of different specific gravities.

<Granulation Step>

The recycled polyester that is recovered is preferably granulated and formed into pellets in order to simplify handling during molding and the like.

The granulation may be implemented before or after the below-described crystallization/solid phase polymerization step, but it is preferable to implement granulation before the crystallization/solid phase polymerization step. When granulation is implemented before the crystallization/solid phase polymerization step, handling ease in the crystallization/solid phase polymerization step is favorable.

In the granulation step, it is preferable to plasticize and granulate the ground product through melt blending. Examples of the granulation device for plasticization and granulation include a single-screw extruder, a twin-screw extruder, and a multi-screw extruder, but any known granulation device can be used. The shape of the pellets is preferably cylindrical, spherical, or elliptical.

The granulation preferably includes, for example, extruding the plasticized recycled polyester into a strand, and cutting the strand into pellets using a pelletizer while cooling in a water tank. Pellets removed from the water tank are usually dried to remove moisture adhered to the surface.

<Crystallization/Solid Phase Polymerization Step>

After the above-described step of recovering the polyester, it is preferable to implement one or more steps selected from a crystallization step and a solid phase polymerization step, and it is more preferable to implement both the crystallization step and the solid phase polymerization step. The crystallization/solid phase polymerization step is preferably implemented on the pelletized polyester described above, but may be implemented on a non-pelletized polyester (for example, the ground product).

Note that when crystallization and solid phase polymerization are both implemented, the polyester is preferably crystallized and then subjected to solid phase polymerization.

Crystallization of the polyester is implemented by maintaining the polyester under constant heating. The crystallization is preferably implemented by heating the polyester at a temperature of from 100 to 230° C., for example. The polyester is crystallized, and thereby mutual fusing of the polyester and adhering of the polyester to the inner surface of the device during solid phase polymerization and molding are prevented.

The solid phase polymerization is preferably implemented by maintaining at a temperature of from the (polyester melting point—80° C.) to less than the melting point of the polyester for a certain duration of time. By implementing the solid phase polymerization at a temperature lower than the melting point, melting of the polyester is prevented, and for example, adhering of the polyester to the device surface, which results in a decrease in work efficiency, is prevented. Also, by implementing the solid phase polymerization at a temperature of equal to or higher than the (melting point—80° C.), the polymerization proceeds at a sufficient polymerization rate, and the desired physical properties are easily obtained.

Solid phase polymerization may be implemented under vacuum conditions, and may be implemented under an inert gas stream such as nitrogen or argon. If solid phase polymerization is implemented under vacuum conditions, the vacuum pressure is preferably 1.0 torr or less, more preferably 0.5 torr or less, and even more preferably 0.1 torr or less. Furthermore, under both vacuum conditions and an inert gas stream such as nitrogen or argon, the oxygen concentration remaining in the system is preferably reduced as much as possible, and the oxygen concentration is preferably 300 ppm or less, and more preferably 30 ppm or less. When the oxygen concentration is set to 30 ppm or less, appearance defects such as yellowing are less likely to occur.

Furthermore, when the solid phase polymerization is implemented under vacuum conditions, it is preferable to uniformly maintain heat transfer while constantly repeating the stirring or mixing of the polyester. When the solid phase polymerization is implemented in the presence of an inert gas, it is preferable to keep the surface of the polyester in contact with a dry gas at all times under a stream of the dry gas.

Examples of the solid-phase polymerization device for implementing the crystallization/solid phase polymerization step include a tumbler-type batch device equipped with a heating jacket, a dry silo-type device provided with inert gas stream equipment, a crystallization device provided internally with a stirrer blade and a discharging screw, and a reactor internally with a stirrer blade and a discharging screw. Note that the crystallization and solid phase polymerization are preferably implemented consecutively or simultaneously in the same device.

The heating time for the solid phase polymerization is determined in a timely manner based on the device and other conditions, but the time may be any time as long as the polyester obtains sufficient physical properties.

The solid phase polymerization maintains the polyester at a high temperature for a long period of time, and therefore impurities present in the polyester may deteriorate the quality such as the color tone. In the removal step described above, a large portion of the polyamide resin is preferably removed, and in this case, the deterioration of quality that may occur during solid phase polymerization is minimized.

In the method for manufacturing recycled polyester of the present invention, steps in addition to the steps described above may be implemented, and a washing step may be implemented to remove contents adhering to the interior of the multilayer container. The washing is preferably implemented by rinsing with a liquid, and may be washing with water, washing with an alkaline aqueous solution, or both.

Furthermore, the washing may be implemented before the multilayer container is ground into a ground product, or may be implemented after grinding, but the washing is preferably implemented before any of granulation, crystallization, and solid phase polymerization are implemented. Furthermore, the washing step may be implemented simultaneously with the grinding step using a grinder called a wet grinder that simultaneously carries out washing and grinding.

In addition, when the washing step is implemented, a drying step may be implemented after the washing step. By implementing the drying step, the amount of moisture in the recycled polyester obtained by the present method can be reduced, and therefore high quality recycled polyester can be provided with high thermal stability and the like. The drying step can be implemented, for example, through air blowing or hot air using a dryer.

When the method for manufacturing recycled polyester includes a step of removing the polyamide resin, the content of the polyamide resin in the obtained recycled polyester is preferably less than 1 mass %, more preferably less than 0.8 mass %, and even more preferably less than 0.6 mass %. By reducing the content of the polyamide resin in this manner, the quality of the recycled polyester becomes favorable.

EXAMPLES

The present invention will be described more specifically hereinafter using examples and comparative examples, but the present invention is not limited to these examples.
[Raw Materials]
The polyester resins, yellowing inhibitors, oxidation accelerators, and greening inhibitors used in the examples and comparative examples were as follows. Furthermore, a polyamide resin manufactured in the following Manufacturing Example 1 was used as the polyamide resin.
<Polyester Resin (X1)>
Isophthalic acid copolymerized polyethylene terephthalate (intrinsic viscosity: 0.83 dL/g, melting point: 248° C.), isophthalic acid-modification ratio: 1.5 mol % (in dicarboxylic acid units), trade name: BK2180, available from Mitsubishi Chemical Corporation
<Yellowing Inhibitor>
Blue RR: Solvent Blue 97 (anthraquinone-based dye), trade name: MACROLEX Blue RR Gran, available from Lanxess AG
K6907: Pigment Blue 15:1 (α-type copper phthalocyanine pigment), trade name: HELIOGEN BLUE K6907, available from BASF SE, form: powdered
<Oxidation Accelerator>
Cobalt(II) stearate: available from Tokyo Chemical Industry Co., Ltd.
Cobalt(II) neodecanoate: available from Nippon Kagaku Sangyo Co., Ltd.

<Greening Inhibitor>
Violet 3R: Solvent Violet 36 (anthraquinone-based dye), trade name: MACROLEX Violet 3R Gran, available from Lanxess AG
K4535: Pigment Red 202 (quinacridone pigment), trade name: Cinquasia Magenta K4535, available from BASF SE
<Polyester Resin (Z1)>
Isophthalic acid copolymerized polyethylene terephthalate (intrinsic viscosity: 0.83 dL/g, melting point: 248° C.), trade name: BK2180, available from Mitsubishi Chemical Corporation
<Polyamide Resin (Y1)>

Manufacturing Example 1 (Manufacturing of Polyamide Resin (Y1))

A reaction container having an internal volume of 50 liters and equipped with a stirrer, a partial condenser, a total condenser, a thermometer, a dropping funnel, a nitrogen introduction tube, and a strand die was filled with precisely weighed materials containing 15000 g (102.6 mol) of adipic acid, 13.06 g (123.3 mmol, 151 ppm as a phosphorus atom concentration in the polyamide) of sodium hypophosphite monohydrate ($NaH_2PO_2 \cdot H_2O$), and 6.849 g (83.49 mmol, 0.68 as a ratio of the number of moles with respect to the sodium hypophosphite monohydrate) of sodium acetate, and then sufficiently subjected to nitrogen purging. The system was then heated to 170° C. while stirring under a stream of a small amount of nitrogen. Next, 13896 g (102.0 mol, 0.994 as a charged molar ratio) of meta-xylylenediamine was added dropwise under stirring, and the temperature inside the system was continuously increased while removing condensed water that was produced to outside of the system. After the completion of dropwise addition of the meta-xylylenediamine, the reaction was continued for 40 minutes at an internal temperature of 260° C. Subsequently, the inside of the system was pressurized with nitrogen, and the obtained polymer was removed from the strand die and pelletized to obtain approximately 24 kg of polyamide.

Next, the polyamide was inserted into a jacketed tumble dryer provided with a nitrogen gas introduction tube, a vacuum line, a vacuum pump, and a thermocouple for measuring the internal temperature, and the inside of the tumble dryer was sufficiently purged with nitrogen gas having a purity of 99 vol % or higher while the tumble dryer was rotated at a constant speed. Subsequently, the tumble dryer was heated under the same nitrogen gas stream, and the temperature of the pellet was increased to 150° C. over approximately 150 minutes. When the temperature of the pellet reached 150° C., the pressure inside the system was reduced to 1 torr or less. Heating was once again continued, and after the temperature of the pellet was increased to 200° C. over approximately 70 minutes, the temperature was maintained at 200° C. for 30 to 45 minutes. Next, nitrogen gas having a purity of 99 vol % or higher was introduced into the system, and the tumble dryer was cooled while being rotated, and a polyamide resin (Y1) was obtained.
Evaluation
The multilayer container of the present invention was evaluated by the following method.
<Oxygen Permeability (Evaluation of Oxygen Barrier Property)>
The oxygen permeability was evaluated by the following method.
An oxygen permeability test by the MOCON method was conducted in accordance with ASTM D3985. The oxygen permeability was measured using the OX-TRAN 2/61 available from MOCON, Inc. A 500 mL bottle obtained in each of the examples and comparative examples was filled with 100 mL of water, nitrogen at 1 atm was circulated inside the bottle at a rate of 20 mL/min under conditions including an oxygen partial pressure of 0.21 atm, a temperature of 23° C., a bottle internal humidity of 100% RH, and an external humidity of 50% RH, and oxygen contained in the nitrogen after circulating inside the bottle was detected by a coulometric sensor, and thereby the oxygen permeability was measured. The lower measurement limit was set to cc/(bottle·day·0.21 atm).

The oxygen permeability was determined using a value for the amount of oxygen permeation after the passage of 7 days from the startup of measurements. A smaller oxygen permeation amount indicates a better oxygen barrier property.

<Yellow Chromaticity Δb* (Evaluation of Yellowing Suppression Performance)>

The yellow chromaticity Δb* of recycled polyester pellets obtained in the below-described Manufacturing of recycled polyester section was measured according to the following method and evaluated by the following criteria.

In accordance with JIS Z 8722, the pellets were poured into a 30 mmφ cell container, and the color tone of the pellets was measured four times by the reflection method using the color difference meter ZE-2000 (a 12 V, 20 W halogen lamp light source available from Nippon Denshoku Industries Co., Ltd.), and an average value was determined as used as the color tone.

Note that the b* value represents the chromaticity. A +b* represents a yellow direction, and a −b* represents a blue direction. Also, a smaller absolute value of the Δb* value means a greater suppression of yellowing. The smaller absolute value also means a higher level of achromaticity. The Δb* value indicates a difference between the b* value of a sample from the following examples and comparative examples and the b* value of the polyester resin alone, subjected to the same treatment as in the examples and comparative examples.

<Green Chromaticity Δa*>

The green chromaticity Δa* of recycled polyester pellets obtained in the below-described Manufacturing of recycled polyester section was measured according to the following method and evaluated by the following criteria.

In accordance with JIS Z 8722, the pellets were poured into a 30 mmφ cell container, and the color tone of the pellets was measured four times by the reflection method using the color difference meter ZE-2000 (a 12 V, 20 W halogen lamp light source available from Nippon Denshoku Industries Co., Ltd.), and an average value was determined as used as the color tone.

Note that the a* value represents the chromaticity. A +a* represents a red direction, and a −a* represents a green direction. Also, a smaller absolute value of the Δa* value means a greater suppression of greening. The smaller absolute value also means a higher level of achromaticity. The Δa* value indicates a difference between the a* value of a sample from the following examples and comparative examples and the a* value of the polyester resin alone, subjected to the same treatment as in the examples and comparative examples.

[Manufacturing of Polyamide Resin Mixture by the Masterbatch Method]

Manufacturing Example 2

An amount of 95.35 mass % of the polyamide resin (Y1), 0.20 mass % of Blue RR as the yellowing inhibitor, 4.25 mass % of cobalt(II) stearate as the oxidation accelerator, and 0.20 mass % of Violet 3R as the greening inhibitor were dry blended in advance. Next, the dry blended mixture was melt-kneaded at 260° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a masterbatch A was obtained.

Next, a polyamide resin mixture was prepared by mixing the obtained masterbatch A and the remaining polyamide resin (Y1) at the mass ratio (masterbatch A/remaining polyamide resin=10/90) indicated in Table 1.

Manufacturing Example 3

An amount of 94.95 mass % of the polyamide resin (Y1), 0.40 mass % of Blue RR as the yellowing inhibitor, 4.25 mass % of cobalt(II) stearate as the oxidation accelerator, and 0.40 mass % of Violet 3R as the greening inhibitor were dry blended in advance. Next, the dry blended mixture was melt-kneaded at 260° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a masterbatch B was obtained.

Next, a polyamide resin mixture was prepared by mixing the obtained masterbatch B and the remaining polyamide resin (Y1) at the mass ratio (masterbatch B/remaining polyamide resin=10/90) indicated in Table 1.

Manufacturing Example 4

An amount of 96.48 mass % of the polyamide resin (Y1), 0.40 mass % of Blue RR as the yellowing inhibitor, 2.72 mass % of cobalt(II) neodecanoate as the oxidation accelerator, and 0.40 mass % of Violet 3R as the greening inhibitor were dry blended in advance. Next, the dry blended mixture was melt-kneaded at 260° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a masterbatch C was obtained.

Next, a polyamide resin mixture was prepared by mixing the obtained masterbatch C and the remaining polyamide resin (Y1) at the mass ratio (masterbatch C/remaining polyamide resin=10/90) indicated in Table 1.

Manufacturing Example 5

An amount of 97.08 mass % of the polyamide resin (Y1), 0.40 mass % of Blue RR as the yellowing inhibitor, 2.12 mass % of cobalt(II) stearate as the oxidation accelerator, and 0.40 mass % of Violet 3R as the greening inhibitor were dry blended in advance. Next, the dry blended mixture was melt-kneaded at 260° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a masterbatch D was obtained.

Next, a polyamide resin mixture was prepared by mixing the obtained masterbatch D and the remaining polyamide resin (Y1) at the mass ratio (masterbatch D/remaining polyamide resin=10/90) indicated in Table 1.

Manufacturing Example 6

An amount of 95.35 mass % of the polyamide resin (Y1), 0.40 mass % of Blue RR as the yellowing inhibitor, and 4.25 mass % of cobalt(II) stearate as the oxidation accelerator were dry blended in advance. A greening inhibitor was not added to this dry blend. Next, the dry blended mixture was melt-kneaded at 260° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a masterbatch E was obtained.

Next, a polyamide resin mixture was prepared by mixing the obtained masterbatch E and the remaining polyamide resin (Y1) at the mass ratio (masterbatch E/remaining polyamide resin=10/90) indicated in Table 1.

Manufacturing Example 7

An amount of 94.95 mass % of the polyester resin (X1), 0.40 mass % of Blue RR as the yellowing inhibitor, 4.25 mass % of cobalt(II) stearate as the oxidation accelerator, and 0.40 mass % of Violet 3R as the greening inhibitor were dry blended in advance. Next, the dry blended mixture was melt-kneaded at 260° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a masterbatch F was obtained.

Next, a polyamide resin mixture was prepared by mixing the obtained masterbatch F and the remaining polyamide resin (Y1) at the mass ratio (masterbatch F/remaining polyamide resin=10/90) indicated in Table 1.

Manufacturing Example 8

An amount of 93.75 mass % of the polyamide resin (Y1), 0.40 mass % of the pigment K6907 as the yellowing inhibitor, 4.25 mass % of cobalt(II) stearate as the oxidation accelerator, and 1.60 mass % of the pigment K4535 as the greening inhibitor were dry blended in advance. Next, the dry blended mixture was melt-kneaded at 260° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a masterbatch G was obtained.

Next, a polyamide resin mixture was prepared by mixing the obtained masterbatch G and the remaining polyamide resin (Y1) at the mass ratio (masterbatch G/remaining polyamide resin=10/90) indicated in Table 1.

Manufacturing Example 9

An amount of 95.75 mass % of the polyamide resin (Y1) and 4.25 mass % of cobalt(II) stearate as the oxidation accelerator were dry blended in advance. Next, the dry blended mixture was melt-kneaded at 260° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a masterbatch H was obtained.

Next, a polyamide resin mixture was prepared by mixing the obtained masterbatch H and the remaining polyamide resin (Y1) at the mass ratio (masterbatch H/remaining polyamide resin=10/90) indicated in Table 1.

[Manufacturing of Polyamide Resin Mixture Containing Polyester Resin]

Manufacturing Example 10 (Polyamide Resin Composition (Y2))

An amount of 99.2 mass % of the polyamide resin (Y1), 0.4 mass % of Blue RR as the yellowing inhibitor, and 0.4 mass % of Violet 3R as the greening inhibitor were dry blended in advance. Next, the dry blended mixture was melt-kneaded at 260° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a polyamide resin composition (Y2) was obtained.

Manufacturing Example 11 (Polyester Resin Composition (Z2))

An amount of 95.75 mass % of the polyester resin (Z1) and 4.25 mass % of cobalt(II) stearate as the oxidation accelerator were dry blended in advance. Next, the dry blended mixture was melt-kneaded at 280° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a polyester resin composition (Z2) was obtained.

Manufacturing Examples 12 to 18 (Polyamide Resin Mixture Containing Polyester Resin)

Polyamide resin mixtures were prepared by mixing the polyamide resin (Y1), the polyamide resin composition (Y2), the polyester resin (Z1), and the polyester resin composition (Z2) at the mass ratios indicated in Table 2. In Table 2, each polyamide resin mixture is indicated by a manufacturing example number.

[Manufacturing of Multilayer Container]

Examples 1 to 13 and Comparative Examples 1 to 4

<Preform Molding>

An injection molding machine (model DU130CI, available from Sumitomo Heavy Industries, Ltd.) having two injection cylinders, and a two-piece mold (available from Kortec, Inc.) were used. The polyester resin (X1) was injected from one injection cylinder, a polyamide resin mixture obtained in Manufacturing Examples 2 to 18 was injected from the other injection cylinder, and under the conditions presented below, a three-layer preform (25 g equivalent setting per preform) formed from a polyester layer/polyamide layer/polyester layer was injection molded and manufactured such that the mass of the polyamide layer relative to the entire preform was as described in Table 1 or 2. The shape of the preform included an overall length of 95 mm, an outer diameter of 22 mm, and a wall thickness of 4.0 mm. The molding conditions for the three-layer preform were as presented below.

Skin-side injection cylinder temperature: 285° C.
Core-side injection cylinder temperature (only for three-layer preform): 265° C.
Resin flow path temperature in the mold: 285° C.
Mold cooling water temperature: 15° C.
Cycle time: 40 seconds <Bottle Molding>

The preform obtained above was biaxially stretch-blow molded using a blow molding device (EFB1000ET, available from Frontier Inc.), and a bottle (hollow multilayer container) was obtained. The overall length of each bottle was 223 mm, the outer diameter was 65 mm, and the internal volume was 500 mL, and the bottom part was petaloid shaped. No dimples were provided in the trunk section. The biaxial stretch-blow molding conditions are as shown below.

The oxygen permeability was evaluated using the bottles obtained in Examples 1 to 7 and Comparative Examples 1 and 2. The results are shown in Table 1.
Preform heating temperature: 103° C.
Stretching rod pressure: 0.7 MPa
Primary blow pressure: 1.1 MPa
Secondary blow pressure: 2.5 MPa
Primary blow delay time: 0.30 seconds
Primary blow time: 0.30 seconds
Secondary blow time: 2.0 seconds
Blow exhaust time: 0.6 seconds
Mold temperature: 30° C.

[Manufacturing of Recycled Polyester]

<Recovery and Granulation Step>

Ten kilograms of the hollow multilayer containers obtained in Examples 1 to 13 and Comparative Examples 1 to 4 were ground with a grinder having a mesh diameter of 8 mm, and the resulting flake-shaped ground product was recovered as recycled polyester.

The recovered recycled polyester was extruded and formed into a strand shape by a twin-screw extruder (TEM26SX available from Toshiba Machine Co., Ltd.) at a heater temperature of 270° C. and a discharge rate of 20 kg/hr, and then cut with a pelletizer and formed into pellets while being cooled in a water tank. Note that in Examples 1 to 13 and Comparative Examples 1 to 4, air elutriation of the polyamide layer was not implemented.

<Crystallization/Solid Phase Polymerization Step>

The pellets obtained in the granulation step were heated at 200° C. for 7 hours under vacuum conditions with the pressure reduced to 1 torr or less. The pellets were removed after the heating treatment, and the yellow chromaticity $\Delta b^*$ and the green chromaticity $\Delta a^*$ were evaluated. The results are shown in Tables 1 and 2.

TABLE 1

|  |  |  |  | Examples | | | | | | | Comparative Examples | |
|---|---|---|---|---|---|---|---|---|---|---|---|---|
|  |  |  |  | 1 | 2 | 3 | 4 | 5 | 6 | 7 | 1 | 2 |
| Polyamide resin mixture | Manufacturing Example No | | | 2 | 3 | 3 | 4 | 5 | 6 | 7 | 8 | 9 |
|  | Masterbatch | Polyamide resin (mass %) | Polyamide resin (Y1) | 9.535 | 9.495 | 9.495 | 9.648 | 9.708 | 9.535 | — | 9.375 | 9.575 |
|  |  | Polyester resin (mass %) | Polyester resin (X1) | — | — | — | — | — | — | 9.495 | — | — |
|  |  | Yellowing inhibitor (mass %) | Blue RR | 0.02 | 0.04 | 0.04 | 0.04 | 0.04 | 0.04 | 0.04 | — | — |
|  |  |  | K6907 | — | — | — | — | — | — | — | 0.04 | — |
|  |  | Oxidation accelerator (mass %) | Cobalt (II) stearate | 0.425 | 0.425 | 0.425 | — | 0.212 | 0.425 | 0.425 | 0.425 | 0.425 |
|  |  |  | Cobalt (II) neodecanoate | — | — | — | 0.272 | — | — | — | — | — |
|  |  | Greening inhibitor (mass %) | Violet 3R | 0.02 | 0.04 | 0.04 | 0.04 | 0.04 | — | 0.04 | — | — |
|  |  |  | K4535 | — | — | — | — | — | — | — | 0.16 | — |
|  | Polyamide resin (Y1) (mass %) | | | 90 | 90 | 90 | 90 | 90 | 90 | 90 | 90 | 90 |
|  | Total (mass %) | | | 100 | 100 | 100 | 100 | 100 | 100 | 100 | 100 | 100 |
| Multilayer container | Polyamide layer (mass %) | Polyamide resin mixture | | 3 | 3 | 5 | 5 | 5 | 5 | 5 | 5 | 5 |
|  | Polyester layer (mass %) | Polyester resin (X1) | | 97 | 97 | 95 | 95 | 95 | 95 | 95 | 95 | 95 |
|  | Total (mass %) | | | 100 | 100 | 100 | 100 | 100 | 100 | 100 | 100 | 100 |
|  | Yellowing inhibitor amount (ppm) | | | 6 | 12 | 20 | 20 | 20 | 20 | 20 | 20 | 0 |
| Evaluation | Oxygen permeability (cc/(bottle · day · 0.21 atm)) | | | <0.001 | <0.001 | <0.001 | <0.001 | <0.001 | <0.001 | <0.001 | 0.002 | <0.001 |
|  | Yellow chromaticity $\Delta b^*$ | | | 7.1 | 0.5 | 0.9 | 0.8 | 0.6 | 1.2 | 1.1 | 1.7 | 23.3 |
|  | Green chromaticity $\Delta a^*$ | | | 1.2 | 0.8 | 1.2 | 1.3 | 1.0 | 15.4 | 1.3 | 1.4 | 1.9 |

As shown in Table 1, the multilayer containers of the examples can exhibit an excellent oxygen barrier property, and by containing even a small amount of a yellowing inhibitor, the multilayer containers thereof can suppress yellowing of the recycled polyester when recycling.

TABLE 2

|  |  |  |  | Examples | | | | | | Comparative Examples | |
|---|---|---|---|---|---|---|---|---|---|---|---|
|  |  |  |  | 8 | 9 | 10 | 11 | 12 | 13 | 3 | 4 |
| Polyamide resin mixture | Manufacturing Example No | | | 12 | 13 | 14 | 15 | 12 | 16 | 17 | 18 |
|  | Polyamide resin (Y1) (mass %) | Polyamide resin (Y1) | | 80 | 73 | 23 | 84 | 80 | 30 | 90 | 40 |

TABLE 2-continued

|  |  |  | Examples | | | | | | Comparative Examples | |
|---|---|---|---|---|---|---|---|---|---|---|
|  |  |  | 8 | 9 | 10 | 11 | 12 | 13 | 3 | 4 |
|  | Polyamide resin composition (Y2) (mass %) | Polyamide resin (Y1) + yellowing inhibitor (Blue RR) 0.4% + greening inhibitor (Violet 3R) 0.4% | 10 | 17 | 17 | 6 | 10 | 10 | — | — |
|  | Polyester resin (X1) (mass %) | Polyester resin (X1) | — | — | 50 | — | — | 50 | — | 50 |
|  | Polyester resin composition (Z2) (mass %) | Polyester resin (Z1) + oxidation accelerator (cobalt(II) stearate) 4.25% | 10 | 10 | 10 | 10 | 10 | 10 | 10 | 10 |
|  | Total (mass %) |  | 100 | 100 | 100 | 100 | 100 | 100 | 100 | 100 |
| Multilayer container | Polyamide layer (mass %) | Polyamide resin mixture | 3 | 3 | 3 | 5 | 5 | 5 | 5 | 5 |
|  |  | Oxidation accelerator amount (mass %) (in resin mixture) | 0.425 | 0.425 | 0.425 | 0.425 | 0.425 | 0.425 | 0.425 | 0.425 |
|  | Polyester layer (mass %) | Polyester resin (X1) | 97 | 97 | 97 | 95 | 95 | 95 | 95 | 95 |
|  | Total (mass %) |  | 100 | 100 | 100 | 100 | 100 | 100 | 100 | 100 |
|  | Yellowing inhibitor amount | (ppm) | 12 | 20 | 20 | 12 | 20 | 20 | 0 | 0 |
|  | Greening inhibitor amount | (ppm) | 12 | 20 | 20 | 12 | 20 | 20 | 0 | 0 |
| Evaluation | Yellow chromaticity Δb* |  | 0.4 | 0.5 | 0.2 | 1.5 | 0.8 | 1.2 | 20.0 | 9.4 |
|  | Green chromaticity Δa* |  | 0.4 | 0.6 | 0.4 | 0.8 | 0.9 | 0.5 | 1.2 | 0.5 |

Further, as shown in Table 2, even when the polyamide layer contains a polyester resin, by using a small amount of a yellowing inhibitor, the multilayer containers of the examples can suppress yellowing of the recycled polyester when recycling.

[Manufacturing of Polyamide Resin Mixture or Polyamide Resin Mixture]

Manufacturing Example 19 (Manufacturing of Polyamide Resin Mixture)

An amount of 94.95 mass % of the polyamide resin (Y1), 0.40 mass % of Blue RR as the yellowing inhibitor, 4.25 mass % of cobalt(II) stearate as the oxidation accelerator, and 0.40 mass % of Violet 3R as the greening inhibitor were dry blended in advance. Next, the dry blended mixture was melt-kneaded at 260° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a masterbatch I was obtained.

Next, a polyamide resin mixture was prepared by mixing the obtained masterbatch I and the remaining polyamide resin (Y1) at the mass ratio (masterbatch I/remaining polyamide resin=indicated in Table 3.

Manufacturing Example 20 (Manufacturing of Polyamide Resin Mixture)

An amount of 95.75 mass % of the polyamide resin (Y1) and 4.25 mass % of cobalt(II) stearate as the oxidation accelerator were dry blended in advance. Next, the dry blended mixture was melt-kneaded at 260° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a masterbatch J was obtained.

Next, a polyamide resin mixture was prepared by mixing the obtained masterbatch J and the remaining polyamide resin (Y1) at the mass ratio (masterbatch J/remaining polyamide resin=indicated in Table 3.

Manufacturing Example 21 (Manufacturing of Polyester Resin Mixture)

An amount of 97.60 mass % of the polyester resin (X1), 1.20 mass % of Blue RR as the yellowing inhibitor, and 1.20 mass % of Violet 3R as the greening inhibitor were dry blended in advance. Next, the dry blended mixture was melt-kneaded at 260° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a masterbatch K was obtained.

Next, a polyester resin mixture was prepared by mixing the obtained masterbatch K and the remaining polyester resin (X1) at the mass ratio (masterbatch K/remaining polyester resin=indicated in Table 3.

[Manufacturing of Multilayer Container]

Example 14 and Comparative Example 5

<Preform Molding>

An injection molding machine (model DU130CI, available from Sumitomo Heavy Industries, Ltd.) having two injection cylinders, and a two-piece mold (available from Kortec, Inc.) were used. The polyester resin (X1) (Example 14) or the polyester resin mixture (Comparative Example 5) obtained in Manufacturing Example 21 was injected from one injection cylinder, the polyamide resin mixture (Example 14) obtained in Manufacturing Example 19 or the polyamide resin mixture (Comparative Example 5) obtained in Manufacturing Example 20 was injected from the other injection cylinder, and under the conditions presented below, a three-layer preform (25 g equivalent setting per preform) formed from a polyester layer/polyamide layer/polyester layer was injection molded and manufactured such that the mass of the polyamide layer relative to the entire preform was as described in Table 3. The shape of the preform included an overall length of 95 mm, an outer diameter of 22 mm, and a wall thickness of 4.0 mm. The molding conditions for the three-layer preform were as presented below.

Skin-side injection cylinder temperature: 285° C.
Core-side injection cylinder temperature (only for three-layer preform): 265° C.
Resin flow path temperature in the mold: 285° C.
Mold cooling water temperature: 15° C.
Cycle time: 40 seconds <Bottle Molding>

The preform obtained above was biaxially stretch-blow molded using a blow molding device (EFB1000ET, available from Frontier Inc.), and a bottle (hollow multilayer container) was obtained. The overall length of each bottle was 223 mm, the outer diameter was 65 mm, and the internal volume was 500 mL, and the bottom part was petaloid shaped. No dimples were provided in the trunk section. The biaxial stretch-blow molding conditions are as shown below.

Preform heating temperature: 103° C.
Stretching rod pressure: 0.7 MPa
Primary blow pressure: 1.1 MPa
Secondary blow pressure: 2.5 MPa
Primary blow delay time: 0.30 seconds
Primary blow time: 0.30 seconds
Secondary blow time: 2.0 seconds
Blow exhaust time: 0.6 seconds
Mold temperature: 30° C.

[Manufacturing of Recycled Polyester Including Air Elutriation Step]

<Recovery, Air Elutriation, and Granulation Step>

Ten kilograms of the hollow multilayer containers obtained in Example 14 and Comparative Example 5 were ground into flakes with a grinder having a mesh diameter of 8 mm, and then the flakes were washed with water. Subsequently, a material having a heavy specific gravity and dropped into a lower receptacle was collected using the froth separator CFS-150 (available from Aco KK) at a feed rate of 10 kg/hr with a suction blower having a frequency of 35 Hz and a secondary blower having a frequency of 30 Hz. The flake-shaped ground product that was ultimately dropped into the lower receptacle was recovered as recycled polyester.

The recovered recycled polyester was extruded and formed into a strand shape by a twin-screw extruder (TEM26SX, available from Toshiba Machine Co., Ltd.) at a heater temperature of 270° C. and a discharge rate of 20 kg/hr, and then cut with a pelletizer and formed into pellets while being cooled in a water tank.

<Crystallization/Solid Phase Polymerization Step>

The pellets obtained in the granulation step were heated at 200° C. for 7 hours under vacuum conditions with the pressure reduced to 1 torr or less. The pellets were removed after the heating treatment, and the yellow chromaticity $\Delta b^*$ and the green chromaticity $\Delta a^*$ were evaluated. The results are shown in Table 3.

TABLE 3

| | | | | Example 14 | Comparative Example 5 |
|---|---|---|---|---|---|
| Polyamide | | Manufacturing Example No | | 19 | 20 |
| resin mixture | Masterbatch | Polyamide resin (mass %) | Polyamide resin (Y1) | 9.495 | 9.575 |
| | | Yellowing inhibitor (mass %) | Blue RR | 0.04 | — |
| | | Oxidation accelerator (mass %) | Cobalt (II) stearate | 0.425 | 0.425 |
| | | Greening inhibitor (mass %) | Violet 3R | 0.04 | — |
| | | Polyamide resin (Y1) (mass %) | | 90 | 90 |
| | | Total (mass %) | | 100 | 100 |
| Polyester | | Manufacturing Example No | | — | 21 |
| resin mixture | Masterbatch | Polyester resin (mass %) | Polyester resin (X1) | — | 4.88 |
| | | Yellowing inhibitor (mass %) | Blue RR | — | 0.060 |

TABLE 3-continued

|  |  |  | Example 14 | Comparative Example 5 |
|---|---|---|---|---|
|  | Greening inhibitor (mass %) | Violet 3R | — | 0.060 |
|  | Polyester resin (X1) (mass %) |  | 100 | 95 |
|  | Total (mass %) |  | 100 | 100 |
| Multilayer container | Polyamide layer (mass %) | Polyamide resin mixture or polyamide resin (Y1) | 7 | 7 |
|  | Polyester layer (mass %) | Polyester resin (X1) or polyester resin mixture | 93 | 93 |
|  | Total (mass %) |  | 100 | 100 |
|  | Yellowing inhibitor amount | (ppm) | 28 | 28 |
| Evaluation | Yellow chromaticity Δb* |  | 0.4 | 20.9 |
|  | Green chromaticity Δa* |  | 0.7 | 1.8 |

As shown in Table 3, the multilayer container of Example 14 demonstrated that by adding a small amount of yellowing inhibitor to the polyamide layer, yellowing of the recycled polyester can be suppressed even when the polyamide layer is removed during recycling. With the multilayer container of Comparative Example 5, for a case in which the polyamide layer was removed when recycling, the addition of the yellowing inhibitor to the polyester layer resulted in a disruption of the quantitative balance between the polyamide resin and the yellowing inhibitor contained in the recycled polyester and an increase in the Δb* value.

The invention claimed is:

1. A multilayer container comprising:
a polyester layer comprising a polyester resin (X); and
a polyamide layer comprising a polyamide resin (Y), a yellowing inhibitor (A), and an oxidation accelerator (B);
a content of the polyamide resin (Y) being from 0.05 to 7.0 mass % relative to a total amount of all polyamide layers and all polyester layers;
the yellowing inhibitor (A) being a dye; and
a content of the yellowing inhibitor (A) being from 1 to 30 ppm relative to the total amount of all polyamide layers and all polyester layers.

2. The multilayer container according to claim 1, wherein the polyester resin (X) comprises a constituent unit derived from a dicarboxylic acid and a constituent unit derived from a diol, 80 mol % or greater of the constituent unit derived from a dicarboxylic acid being a constituent unit derived from terephthalic acid, and 80 mol % or greater of the constituent unit derived from a diol being a constituent unit derived from ethylene glycol.

3. The multilayer container according to claim 1, wherein the polyamide resin (Y) comprises a constituent unit derived from a diamine and a constituent unit derived from a dicarboxylic acid, 80 mol % or greater of the constituent unit derived from a diamine being a constituent unit derived from xylylene diamine, and 80 mol % or greater of the constituent unit derived from a dicarboxylic acid being a constituent unit derived from adipic acid.

4. The multilayer container according to claim 1, wherein the yellowing inhibitor (A) is an anthraquinone-based dye.

5. The multilayer container according to claim 1, wherein the multilayer container is a hollow multilayer container.

6. The multilayer container according to claim 1, wherein the multilayer container has a 2 to 5 layer structure, and an outermost layer is a polyester layer.

7. The multilayer container according to claim 1, wherein the multilayer container has a 3 to 5 layer structure, and the outermost layer and an innermost layer are polyester layers.

8. The multilayer container according to claim 1, wherein the oxidation accelerator (B) is a compound comprising a transition metal.

9. The multilayer container according to claim 8, wherein the transition metal is at least one selected from the group consisting of cobalt, iron, manganese, and nickel.

10. The multilayer container according to claim 1, wherein the polyamide layer further comprises a greening inhibitor (C).

11. The multilayer container according to claim 10, wherein the greening inhibitor (C) is at least one selected from the group consisting of anthraquinone-based dyes and azo-based dyes.

12. The multilayer container according to claim 1, wherein the polyamide layer further comprises a polyester resin (Z).

13. The multilayer container according to claim 12, wherein a content of the polyester resin (Z) in the polyamide layer is from 5 to 70 mass %.

14. A method for manufacturing a multilayer container comprising:
a polyester layer comprising a polyester resin (X); and
a polyamide layer comprising a polyamide resin (Y), a yellowing inhibitor (A), and an oxidation accelerator (B);
a content of the polyamide resin (Y) being from 0.05 to 7.0 mass % relative to a total amount of all polyamide layers and all polyester layers;
the yellowing inhibitor (A) being a dye; and
a content of the yellowing inhibitor (A) being from 1 to 30 ppm relative to the total amount of all polyamide layers and all polyester layers; and
the manufacturing method comprising:
a step 1 of mixing the polyamide resin (Y), the yellowing inhibitor (A), and the oxidation accelerator (B) to prepare a polyamide resin mixture;
a step 2 of co-injection molding the polyamide resin mixture and a polyester resin composition containing the polyester resin (X), and thereby obtaining a multilayer preform; and a step 3 of blow molding the multilayer preform.

15. The method for manufacturing a multilayer container according to claim 14, wherein in step 1, a greening inhibitor (C) is further mixed.

16. The method for manufacturing a multilayer container according to claim 14, wherein in step 1, a polyester resin (Z) is further mixed.

17. The method for manufacturing a multilayer container according to claim 14, wherein in step 1, a polyamide resin or polyester resin, the yellowing inhibitor (A), and the oxidation accelerator (B) are kneaded and then mixed with the polyamide resin (Y).

18. The method for manufacturing a multilayer container according to claim 14, wherein the oxidation accelerator (B) is a compound comprising a transition metal.

19. The method for manufacturing a multilayer container according to claim 14, wherein the yellowing inhibitor (A) is an anthraquinone-based dye.

20. A method for manufacturing a recycled polyester, the method comprising recovering polyester from the multilayer container described in claim 1.

\* \* \* \* \*